US00RE38197E

(19) United States
(12) Reissued Patent
Sakamoto et al.

(10) Patent Number: US RE38,197 E
(45) Date of Reissued Patent: Jul. 22, 2003

(54) MULTIFUNCTION ELECTRONIC ANALOG TIMEPIECE

(75) Inventors: Kenji Sakamoto, Suwa (JP); Akihiko Maruyama, Suwa (JP); Tatsuo Moriya, Suwa (JP); Hiroshi Yabe, Suwa (JP); Takashi Kawaguchi, Suwa (JP); Masato Yoshino, Suwa (JP)

(73) Assignee: Seiko Epson Corporation, Tokyo (JP)

(21) Appl. No.: 08/606,029

(22) Filed: Feb. 22, 1996

Related U.S. Patent Documents

Reissue of:
(64) Patent No.: 5,289,452
Issued: Feb. 22, 1994
Appl. No.: 08/008,061
Filed: Jan. 22, 1993

U.S. Applications:
(63) Continuation of application No. 07/368,455, filed on Jun. 19, 1989, now abandoned, which is a continuation-in-part of application No. 07/340,620, filed on Apr. 19, 1989, now Pat. No. 5,016,231.

(30) Foreign Application Priority Data

Jun. 17, 1988 (JP) ..... 63-150862
Jun. 17, 1988 (JP) ..... 63-150873
Jul. 14, 1988 (JP) ..... 63-176040

(51) Int. Cl.[7] ..... G04B 23/02; G04B 19/04; G04F 8/00

(52) U.S. Cl. ..... 368/73; 368/80; 368/107; 368/113; 368/157

(58) Field of Search ..... 368/72–74, 76, 368/80, 107–113, 155–157

(56) References Cited

U.S. PATENT DOCUMENTS 4,150,536 A 4/1979 Nakajima et al.
4,253,172 A * 2/1981 Nomura
4,275,463 A * 6/1981 Ishida
4,280,209 A * 7/1981 Mooney
4,282,593 A 8/1981 Flaig et al. ..... 368/63
4,357,693 A * 11/1982 Plancon et al.
4,382,686 A * 5/1983 Giger et al.
4,382,692 A * 5/1983 Wiget et al.
4,445,785 A * 5/1984 Chambon et al.
4,470,707 A * 9/1984 Chambon et al.
4,494,410 A 1/1985 Van Bochove et al.
4,523,857 A * 6/1985 Ushikoshi
4,537,514 A * 8/1985 Morita
4,623,260 A * 11/1986 Kamiyama
4,623,261 A * 11/1986 Muto
4,652,140 A * 3/1987 Nakazawa
4,694,410 A * 9/1987 Murata
4,748,603 A * 5/1988 Ray et al.
4,821,248 A * 4/1989 Yamasaki

FOREIGN PATENT DOCUMENTS

DE 3325302 * 1/1984
EP 0247520 * 12/1987

(List continued on next page.)

OTHER PUBLICATIONS

France Horlogere, vol. 448, Dec. 1983.*
Journal Suisse d'Horlogerie et de Bijouterie, vol. 2, 1981.*
"Electronics Sourcebook for Technicians and Engineers" (McGraw–Hill), Chapter 18: Microprocessors and Microcomputers, published 1988.

*Primary Examiner*—Vit Miska
(74) *Attorney, Agent, or Firm*—Stroock & Stroock & Lavan LLP

(57) ABSTRACT

A multifunction electronic analog timepiece includes a face and a plurality of indicators positioned on the face for displaying at least two time keeping functions. At least two step motors are provided for driving the plurality of time keeping function indicators. The time keeping function indicators are arbitrarily disposed about the face dependent upon the number of step motors and position of step motors required to drive the indicators. A microcomputer is provided and includes a program memory for storing software instructions for controlling the step motors.

61 Claims, 27 Drawing Sheets

FOREIGN PATENT DOCUMENTS

| | | | |
|---|---|---|---|
| EP | 0 250 142 | | 12/1987 |
| EP | 0253227 | * | 2/1990 |
| EP | 0267440 | * | 5/1990 |
| GB | 1 554 899 | | 10/1979 |
| GB | 2067798 | * | 7/1981 |
| GB | 2 987 601 | | 5/1982 |
| GB | 2154767 | * | 9/1985 |
| GB | 2166570 | * | 5/1986 |
| GB | 2167884 | * | 6/1986 |
| JP | 51-38662 | | 3/1976 |
| JP | 54-151071 | | 11/1979 |
| JP | 55-48681 | | 4/1980 |
| JP | 55-48682 | | 4/1980 |
| JP | 56-24238 | | 6/1981 |
| JP | 56-145385 | | 11/1981 |
| JP | 57-142583 | | 9/1982 |
| JP | 57-169691 | | 10/1982 |
| JP | 5716240 | * | 7/1984 |
| JP | 6033001 | * | 2/1985 |
| JP | 60-66177 | | 4/1985 |
| JP | 60-236083 | | 11/1985 |
| JP | 61-286783 | | 12/1986 |
| JP | 62-299785 | | 12/1987 |
| JP | 1-260392 | | 10/1989 |
| JP | 1-270693 | | 10/1989 |
| JP | 2755386 | | 10/1989 |

* cited by examiner

MULTIFUNCTION ELECTRONIC ANALOG TIMEPIECE

Matter enclosed in heavy brackets [ ] appears in the original patent but forms no part of this reissue specification; matter printed in italics indicates the additions made by reissue.

CROSS REFERENCE TO RELATED APPLICATION

This is a continuation of application Ser. No. 07/368,455 filed Jun. 19, 1989 abandoned which is a continuation-in-part application of Ser. No. 07/340,620 filed on Apr. 19, 1989 U.S. Pat. No. 5,016,231.

BACKGROUND OF THE INVENTION

The present invention relates to an electronic analog timepiece, and in particular, to an electronic timepiece having multifunction indicators such as chronograph indication, timer indication and elapsed time indication.

To meet consumer demand, electronic analog timepieces such as watches have been manufactured having multifunctions such as chronograph, alarm, elapsed time and the like. Multifunction electronic analog watches are known from Japanese Patent Laid Open Nos. 286783/86 and 294388/86 and Japanese Utility Model Laid Open No. 26191/86 and include a small second hand, alarm hour/minute hands and other analog indicators in addition to twelve hour second, hour and minute hands. A small window for exclusive multifunction use is provided at arbitrary positions on the watch face for example, at the six o'clock watch face position, or some other position to indicate a special non-time keeping function such as the alarm time. Additionally an auxiliary stem, in addition to the normally provided stem, and a switch for switching into multifunction modes are required. The addition of multifunction indicators, stems and switches makes it possible to provide a variety of watch designs to cope with diversified consumer preferences and requirements.

These prior art multifunction electronic analog watches have been less than satisfactory. An individual watch movement structure and integrated circuit ("IC") for driving the structure are required for each combination of functions to be added. Accordingly, the movement structure and positioning of parts within the watch structure must be changed in accordance with the positioning of function indicators and due to the addition or reduction of functions and specification changes. Accordingly, the IC must be changed to match each new watch embodiment. Accordingly, manufacturers are forced to produce a variety of multifunction watches in small quantities to comply with consumer requirements as well as to provide a large variation in watch design function.

To vary the prior art multifunction electronic analog watches requires providing a number of dies, additional manual labor for changing the parts for each new watch model, changing the IC mask in accordance with each IC change as well as the time and work required for each design change resulting in a high cost for each multifunction electronic watch. Additionally, to design a multifunction watch with a redundancy which allows the disposition of a variety of parts and IC constructed to satisfy various embodiments of a single model electronic watch leads to a large watch site as well as increasing the cost of each watch.

Additionally, development of such ICs requires a relatively long period of time to design. It is therefore difficult to accommodate current market needs due to the long lead time required. Modification to the IC must be made on a large scale when adding new functions to the watch or otherwise changing the manufacturing specifications. Such modifications can require the IC to be totally redesigned. A single IC is also not able to cope with functional variations in the watch. Consequently, the constant changing diversified needs of the consumer cannot be satisfied by conventional multifunctional analog electronic watches.

The prior art multifunction electronic analog watches are also provided with an alarm. The alarm operates in an alarm ringing mode-and an alarm non-ringing mode. In the alarm ringing mode, a preset alarm set time is retained even after the alarm has been activated. The alarm also rings a predetermined period of time after the initial occurrence of the alarm ringing, such as, when the alarm set time again coincides with a current time. For example, this would occur each hours on a conventional multifunction analog electronic watch. In the prior art, to prevent the successive ringing of the alarm once the alarm has occurred, the alarm must be put into a mode which prohibits alarm activation through some switch operation or the like. Additionally, when resetting the alarm from the ringing prohibition state, the ringing prohibition state must be released thus involving a complicated operation. Accordingly, when the alarm is to be set in its alarm activated mode for two distinct alarm times, for example, if the alarm is to be activated a first time and then ten minutes in the future, the user of the watch must calculate the time in which the alarm is to be reactivated, add that time to the current time and then set the alarm for this second activation time, a rather involved procedure.

Accordingly, it is desired to provide a multifunction electronic analog watch which is applicable to a large diversity of watch functions and designs while ensuring efficiency in design and manufacture.

SUMMARY OF THE INVENTION

Generally speaking, in accordance with the invention, an improved multifunction analog electronic watch includes a wheel train for indicating ordinary time and at least one or more wheel trains for indicating additional functions. A step motor for driving the ordinary time wheel train and at least one or more step motors for driving the additional function wheel trains is provided. A microcomputer having a program memory allows twelve hour time and the additional functions are indicated at arbitrary positions of at least a movement center position, and additional arbitrary off center positioning such as at least one of a position on an axis at the twelve o'clock position, three o'clock position, the six o'clock position and the nine o'clock position according to the number and disposition of additional function indicators and step motors. A microcomputer on an IC chip having programmable memory controls driving of the step motors. An actuating signal generated by the microcomputer is determined by the disposition of the ordinary time indicating wheel train and the additional function indicating wheel trains. The actuating signal is adapted to various structures by rewriting software in the programmable memory.

An integrated circuit is provided which includes a core CPU and programmable memory. The programmable memory stores software commands for actuating the core CPU. A motor drive drives the plurality of step motors. A motor drive control circuit selectively supplies a predetermined drive signal to the motor drive in accordance with the software commands.

The watch also includes a plurality of indicators each being driven by at least one or more step motors. At least one of the functions of the multifunction analog electronic watch is an alarm. An alarm controlling means in conjunction with at least one of the step motors causes at least one of the indicators to indicate current time when the alarm time is not set, indicate the alarm set time once the alarm time is set, indicate the current time and release the alarm set time from its previous setting once the alarm is activated. When the alarm set time and the normal 12 hour time coincide, the alarm is activated and the alarm set time is then released from being set. When the alarm set time and the current 12 hour time coincide during setting of the alarm, the quick setting of the alarm set time is inoperative.

Accordingly, it is an object of this invention to provide an improved electronic analog multifunction watch.

Another object of this invention is to provide an multifunction electronic analog watch which may be easily adapted to provide a number of different functions within a number of different watch designs.

Yet another object of the invention is to provide a multifunction electronic analog watch which facilitates manufacturing a variety of multifunction analog watches utilizing redundant machinery, IC masks and other parts.

Still another object of the invention is to provide a multifunction electronic analog watch which may be adapted to a variety of configurations by reprogramming software rather than reconstructing the IC chip.

A further object of the invention is to provide a multifunction electronic analog watch which simplifies operation of the watch by omitting structure which prohibits the alarm from being rung when the alarm is not to be rung again once the alarm has been activated and structure for releasing the alarm from the ringing prohibited state when the alarm is being reset, while reducing the number of external operating members and simplifying the use of the alarm function when used as a timer to the required alarm setting.

Still other objects and advantage of the invention will in part be obvious and will in part be apparent from the specification and drawings.

The invention accordingly comprises features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
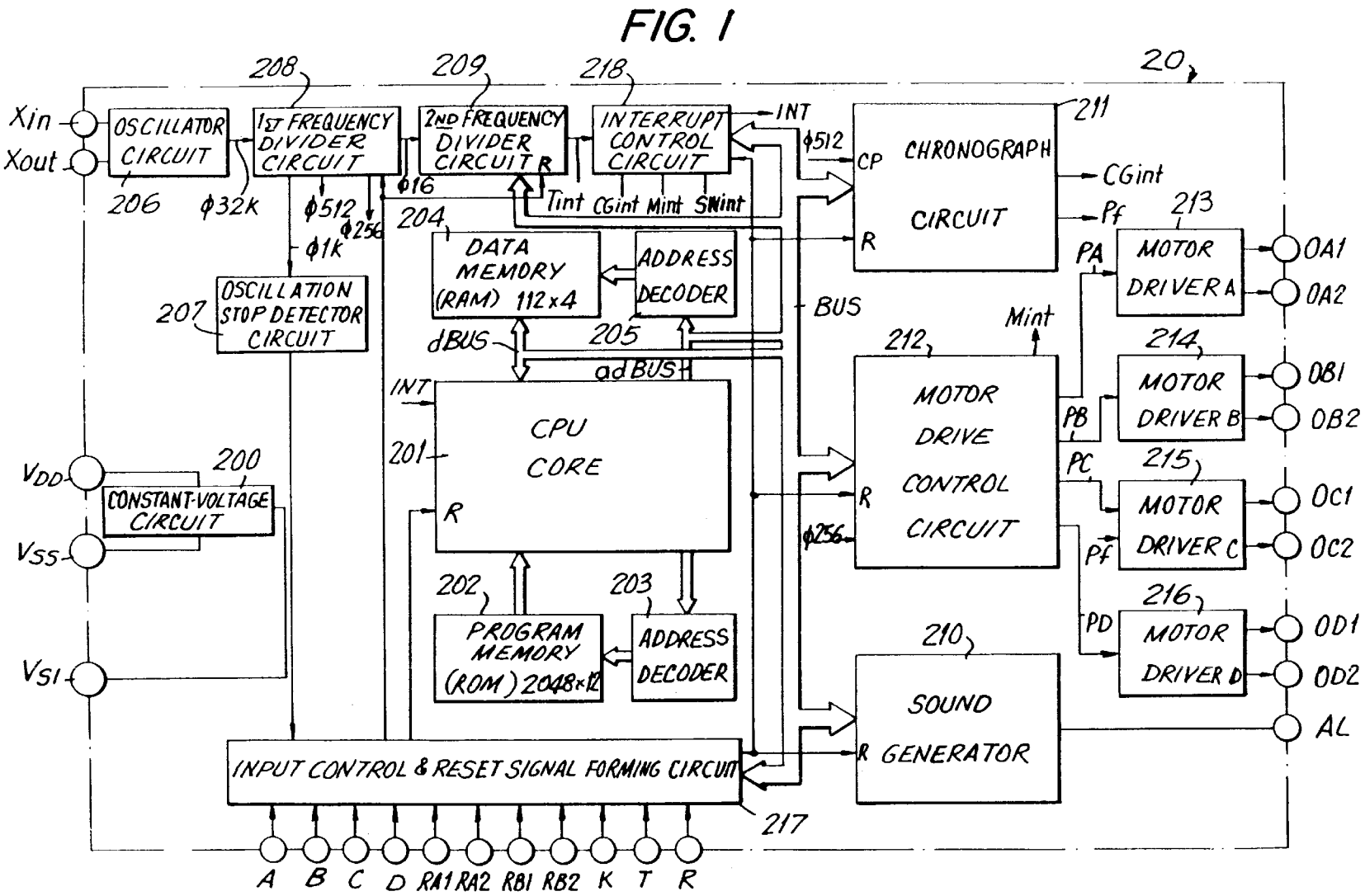
FIG. 1 is a block diagram of a CMOS-IC for use in a multifunction analog electronic watch constructed in accordance with the invention.

Reference is first made to FIG. 1 in which a block diagram of an integrated circuit (CMOS-IC), generally indicated as 20, for driving a multifunction analog watch is provided. CMOS-IC 20 is a micro-computer for controlling a multifunction electronic analog time-piece having a program memory 202, a data memory 204, four motor drivers 213, 214, 215 and 216, a motor drive control circuit 212, a sound generator 210 and an interrupt control circuit 218 integrally formed by a single chip with a core CPU 201 at its center.

Core CPU 201 includes an alarm unit, a register for arithmetic operation, an address control register, a stack pointer, an instruction register, an instruction decoder and other known structure. CPU 201 is connected to peripheral circuits to be described below through an address bus (adbus) and data bus (dbus) based on the memory map I/O technique. An address decoder 203 receives an input from CPU 201 and provides a decoded output to program memory 202. Program memory 202 is a program memory having a mask ROM of 2048 words by 12 bit configuration which stores the operating software for the integrated circuit. Program memory 202 provides an operation output for CPU 201. An address decoder 205 receives an output from CPU 201 along the adbus and provides a decoded output to data memory 204. Data memory 204 is a RAM of 112 words by four bits which is used as a timer for the various types of timer counting and as a counter for storing the position of the respective indicator hands. Data memory 204 provides an output and receives inputs from CPU 201 along the dbus.

An oscillator circuit 206, coupled to a tuning fork type oscillator 58 at terminal $X_{in}$ and $X_{out}$, oscillates at a frequency of 32768 Hz. Oscillator circuit 206 produces an output signal [ϕ32K] *ϕ32K* of 32768 Hz. A first frequency divider circuit 208 divides signal ϕ32K and outputs signals ϕ16 of 16 Hz. A second frequency divider circuit 209 successfully divides the signal ϕ16 of 16 Hz into a signal [ϕ1] *ϕ1* of 1 Hz. A signal ϕ8 of 8 Hz is internally generated within second frequency divider circuit 209 and read by CPU 201 through a main bus BUS. An oscillation stop detector circuit 207 receives an input [ϕ1] *ϕ1K* produced by first frequency divider circuit 208, detects the termination of oscillation by oscillation circuit 206 and resets CMOS-IC 20.

The status of respective frequency divider stages within the range from 8 Hz to 1 Hz can be read into core CPU 201 under the control of software. Furthermore, in this embodiment, the signal ϕ16 of 16 Hz, the signal 8 of 8 Hz and ϕ1 of 1 Hz are used as a time interrupt ("Tint") for performing processes such as time counting or the like. Time interrupt Tint occurs upon a falling edge of each signal. Reading, resetting and masking are respective interrupt factors all carried out under the control of the software such that resetting and masking can be independently affected for each of the interrupt factors.

A sound generator 210 receives inputs along the main bus BUS and produces a buzzer drive signal output at a terminal AL of CMOS-IC 20. The driver frequency, ON/OFF and sound patterns of the buzzer drive signal are controlled in accordance with the software commands which cause data and addresses to be transmitted to sound generator 210 along main bus BUS.

A chronograph circuit 211 receives a ϕ512 input at a terminal CP produced by first frequency divider circuit 208 to provide an output to control hand drive. Chronograph circuit 211 is arranged to control hand driving of a 1/100 second hand, greatly reducing the burden exerted on the software.

Figure 2:
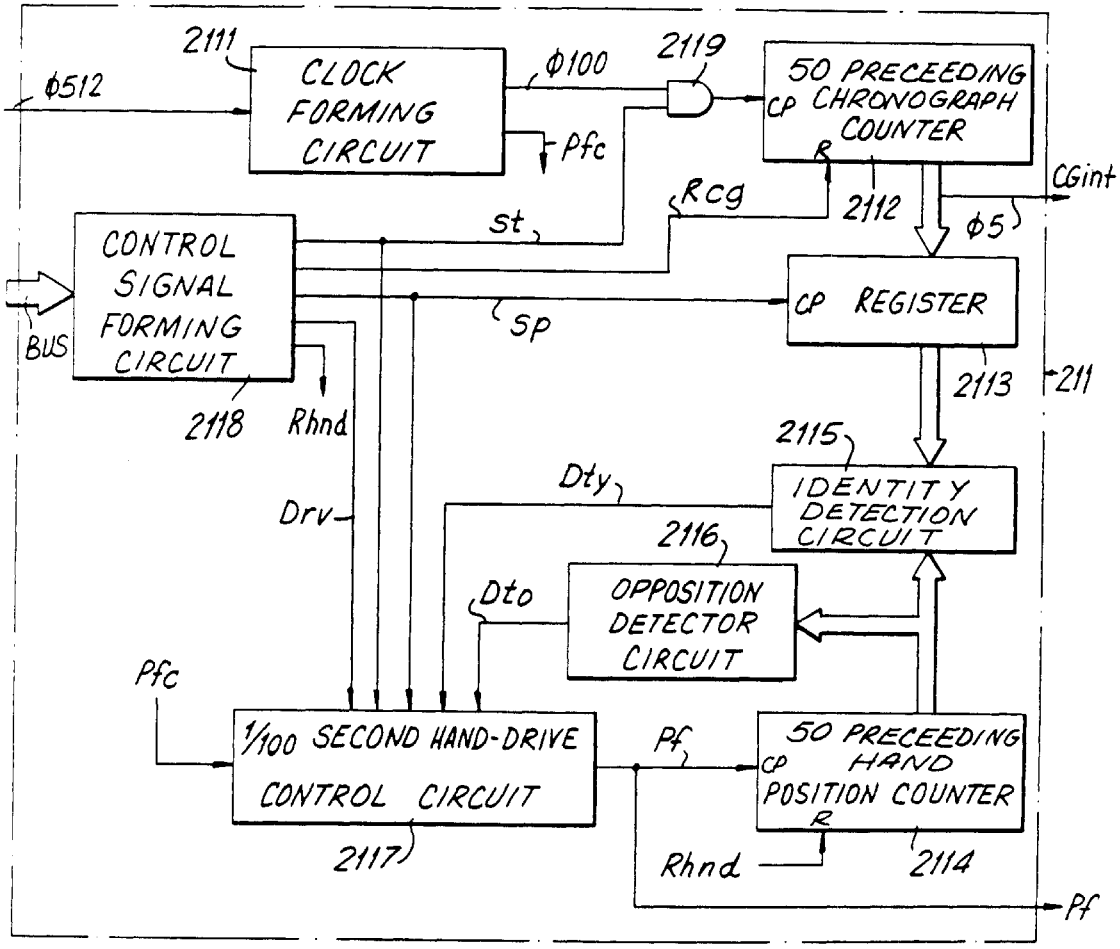
FIG. 2 is a block diagram of a chronograph circuit constructed in accordance with the invention.

Reference is made to FIG. 2 where a block diagram for a chronograph circuit 211 is provided. A clock forming circuit 211 receives signal ϕ512 of 512 Hz produced by first frequency divider circuit 208 and produces a signal ϕ100 of 100 Hz which acts as a reference clock for a chronographic time counting as well as clock pulse Pfc of 100 Hz and 3.91 ms pulse width which are utilized to form 1/100 second hand drive pulses Pf. A control signal forming circuit 2118 receives data and addresses along main bus BUS and in response thereto produces a start signal St for commanding start/stop of chronograph time counting, a split signal Sp for commanding ON/OFF switching of the split indication, a chronograph reset signal Rcg for resetting chronograph time counting, a 0-position signal Rhnd for storing the 0-position of the 1/100 second hand and a signal Drv for commanding operative/inoperative switching of the 1/100 second hand. AND gate 2119 receives the inputs of signal ϕ100 and signal St and provides a gated output to a 50 preceding chronograph counter 2112. [50] *50* preceding chronograph counter 2112 counts the signal 100 having passed AND gate 2119 and is reset by chronograph reset signal Rcg input at terminal R.

A register 2113 holds the contents of chronograph counter 2112 when control signal forming circuit 118 outputs split indication command signal Sp. A [50] *50* preceding hand position counter 2114 stores the indicated position of the 1/100 second hand by counting the 1/100 second hand drive pulses Pf produced by a 1/100 second drive control circuit 2117 and is reset in response to signal Rhnd output from control signal 2118 to store the 0-position of the 1/100 second hand.

Identity detector circuit 2115 compares the contents of register 2113 with the contents of *50 preceding* hand position counter 2114 and outputs an identity signal Dty when the contents are identical. A 0-position detector circuit 2116 outputs a 0 detection signal Dto upon detecting 0 in the hand position counter 2114. When the contents of chronograph counter 2112 and *50 preceding* hand position counter 2114 are identical during an operative state of the 1/100 second hand and chronographic time counting or when the contents of register 2113 and *50 preceding* hand position counter 2114 differ during split indication and no time counting is occurring, or when the contents of [1/50] *50 preceding* hand position counter 2114 is other than zero during the inoperative state of the 1/100 second hand and chronograph time counting occurs, 1/100 second hand drive control circuit 2117 passes clock pulses Pfc.

The 1/100 second hand can only be driven by a step motor C 27. (FIG. 10) A carry signal ϕ5 of 5 Hz output by chronograph counter 2112 causes a chronograph interrupt CGint with which the software is able to advance the processing of time counting by amounts greater than one fifth of a second.

Figure 3:
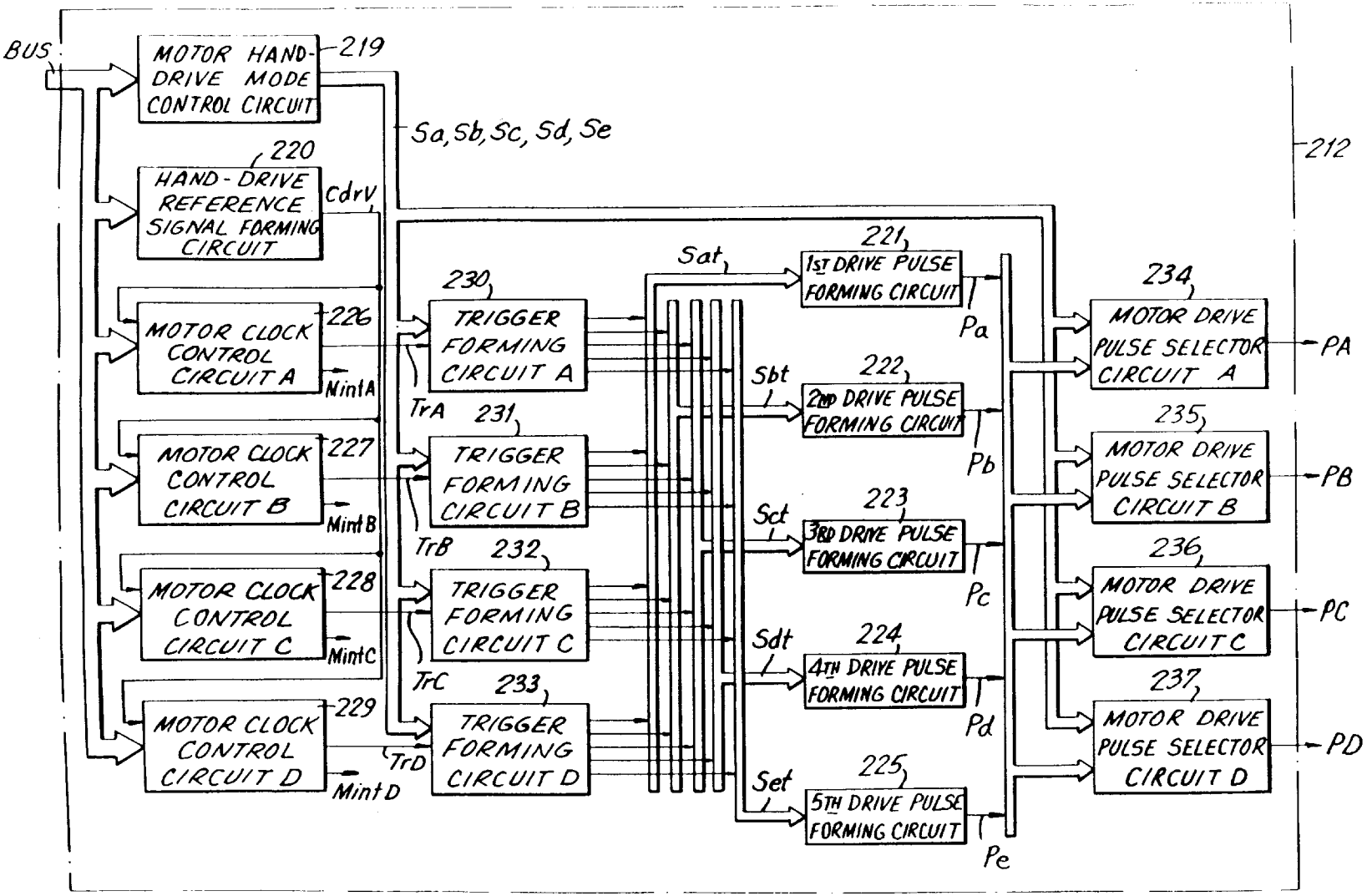
FIG. 3 is a block diagram of a motor drive control circuit constructed in accordance with the invention.

Returning to FIG. 1, a motor drive control circuit 212 is controlled by software commands received by core CPU 201 causing addresses and data to be transmitted along main bus BUS and provides outputs PA, PB, PC, PD for driving respective motor drivers 213, 214, 215 and 216. As seen in greater detail in FIG. 3, motor drive control circuit 212 includes a motor hand drive mode control circuit 219 which stores the hand drive mode of respective motors. Motor hand drive mode control circuit 219 forms and outputs respective control signals Sa, Sb, Sc, Sd and Se in response to software commands read by core CPU 201 which in turn cause data from data memory 204 and addresses from core CPU 201 to be transmitted along main bus BUS. Control signal Sa selects forward drive I drive mode. Control signal Sb selects forward drive II drive mode. Control signal Sc selects reverse drive I drive mode. Control signal Sd selects reverse drive II and control signal Se selects forward correction drive modes for driving the step motors. A hand drive reference signal forming circuit 220 receives software command input along BUS and forms hand drive reference clock signal Cdrv in response thereto.

Figure 4:
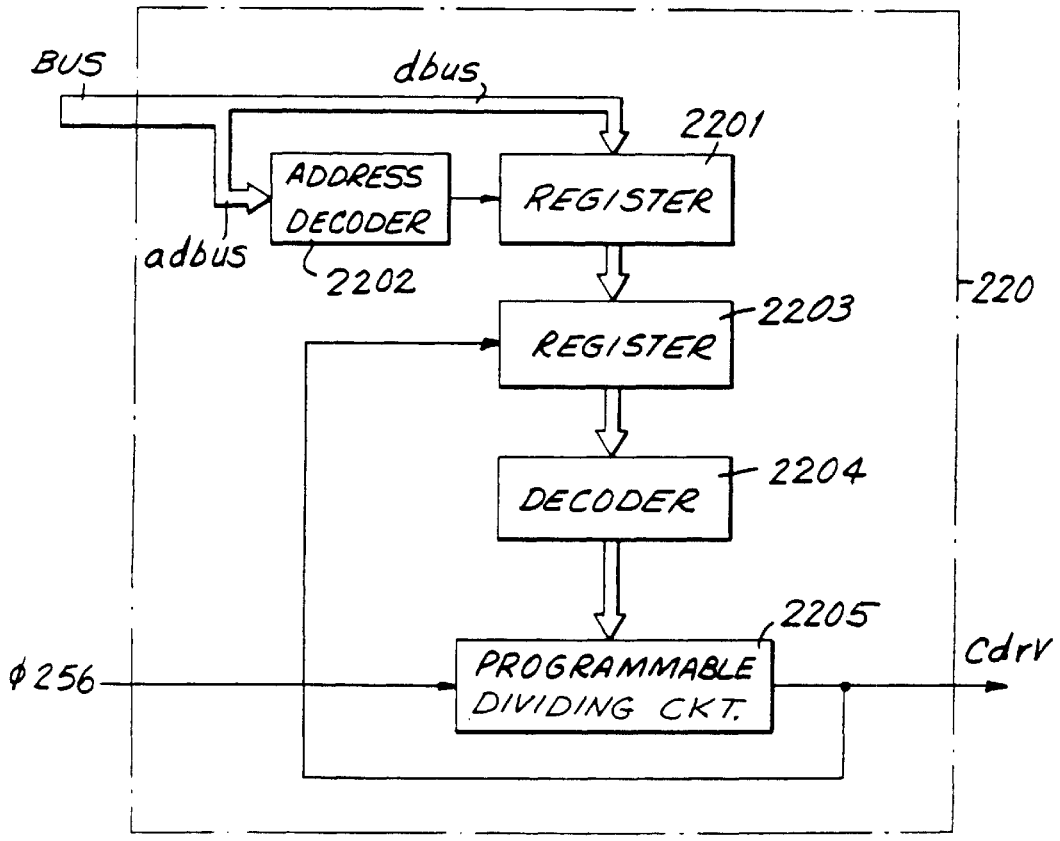
FIG. 4 is a block diagram of a reference signal forming circuit constructed in accordance with the invention.

As seen in FIG. 4, hand drive reference signal forming circuit 220 includes a programmable frequency divider 2205 which receives input ϕ256 having 256 Hz output by first frequency divider 208 and forms a signal having a frequency 1/n the input frequency and outputting this signal as reference clock Cdrv. A three bit register 2201 stores data input from dbus for determining the frequency of the hand drive reference clock Cdrv. An address decoder 2202 receives software commands along adbus and provides an output command 20 signal to three bit register 2201 for determining the frequency of hand drive reference clock Cdrv. A three bit register 2203 receives data stored in register 2201 upon each falling edge of hand drive reference clock Cdrv output by programmable frequency divider 2205. A decoder 2204 outputs the numbers 2, 3, 4, 5, 6, 8, 10, 16 in binary notation corresponding to data stored in register 2203. Programmable frequency divider 2205 divides the input ϕ256 signal in accordance with the output of decoder 2204 producing clock Cdrv.

In response to software commands, hand drive reference signal forming circuit 220 can select any one of eight values to be the frequency of hand drive reference clock Cdrv, specifically, 128 Hz, 85.3 Hz, 64 Hz, 81.2 Hz, 42.7Hz, 32 Hz, 25.6 Hz, and 16 Hz. Changing the frequency of hand drive reference clock Cdrv is done when the data is input into register 2203. Data is input into register 2203 in synchronism with the output of hand drive reference clock Cdrv. An interval of 1/fa has to be utilized in changing the previous frequency fa of hand drive reference clock Cdrv to subsequent frequency Fb. When forward drive I and backward drive *I* are carried in succession, the frequency of hand drive reference clock Cdrv is limited to less than 64 Hz.

Figure 9:
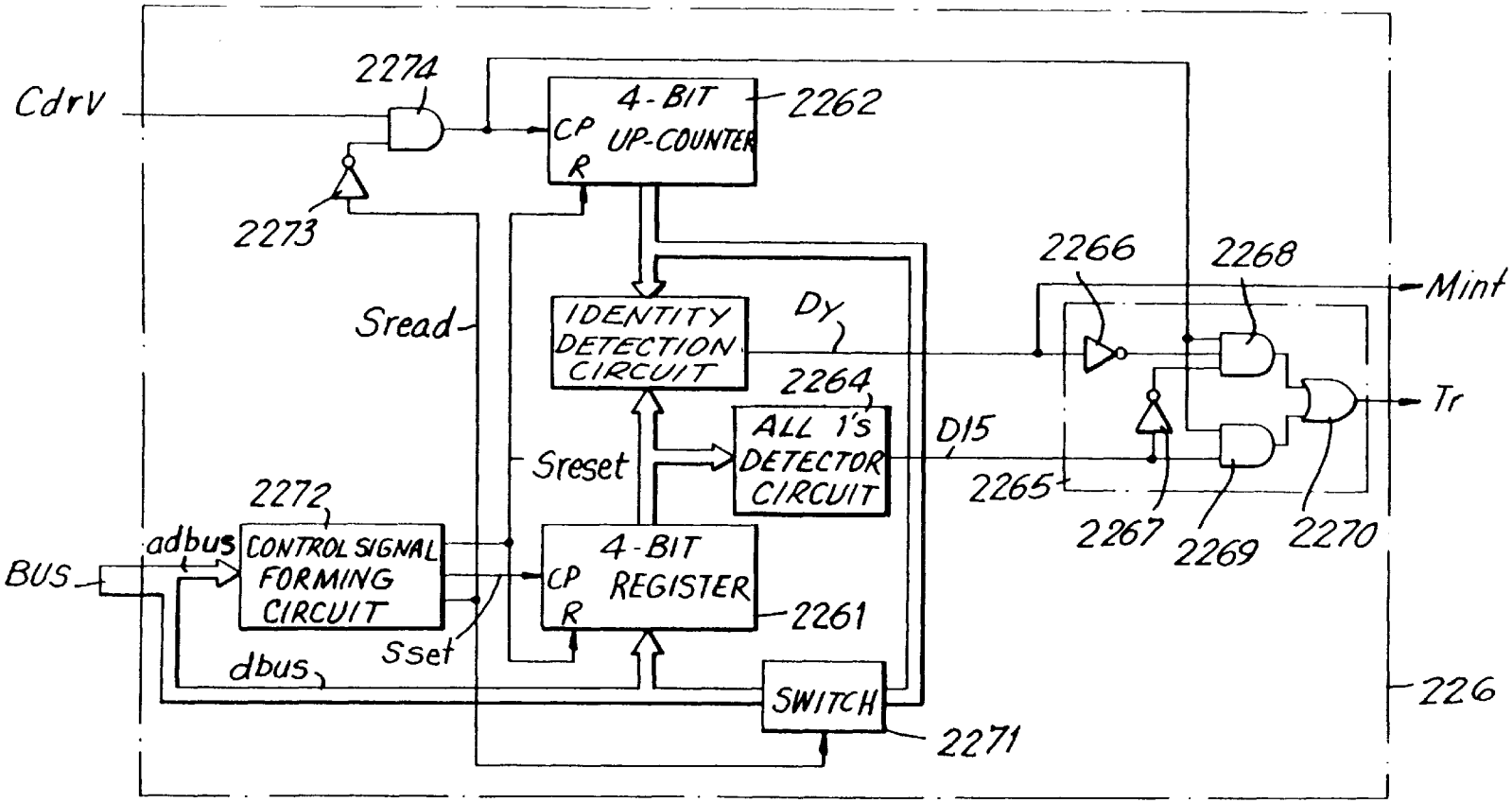
FIG. 9 is a block diagram of a motor clock controlling circuit constructed in accordance with the invention.

Returning to FIG. 3, motor clock control circuits 226, 227, 228 and 229 are motor clock control circuits for controlling the number of hand drive pulses supplied to respective step motors A 3, B 15, C 27 and D 32 in response to software commands read by core CPU 201 and hand drive reference clock Cdrv. As seen in FIG. 9, each motor clock control circuit 226–229 includes a control signal forming circuit 2272 which in response to addresses input along adbus, which are output in response to software commands, outputs a signal [Set] *Sset,* a signal Sread and a signal Sset. A four bit register 2261 stores the number of hand drive pulses provided by the software input along dbus. An AND gate 2274 receives hand drive reference clock Cdrv and an inverted Sread signal from invertor 2273 and produces a gated hand drive reference clock Cdrv. A four bit up counter 2262 counts the gated hand drive reference clock Cdrv and is reset by control signal Sreset. Identity detector 2263 compares the coincidence between the contents of register of 2261 and four bit up counter 2262. Identity detector 2263 outputs identity signal Dy upon detecting an identity between the contents. An all 1's detector circuit 2264 outputs an all 1's detection signal D15 when the contents of register 2261 is all 1's.

A trigger signal generator 2265 includes an invertor 2266 which receives signal Dy and provides a first input to AND gate 2268. An invertor 2267 receives signal D15 and provides an inverted input to AND gate 2268. AND gate 2268 also receives the gated hand reference clock Cdrv and provides an output to an OR gate 2270. A second AND gate 2269 receives the gated hand drive reference clock Cdrv and signal D15 as inputs and provides a second input to OR gate 2270 which produces an output Tr as the output of trigger signal generator 2265.

When all 1's are present in register 2261, in one example a total of fifteen, motor pulses continue to be repeatedly output until different data is input. When data other than all 1's is input into register 2261, motor pulses are output a number of times corresponding to that data and then stopped until the data is reset. A bi-directional switch 2271 is turned on upon the output of control signal Sread for placing the data stored in up counter 2262 onto data buses. Control signal forming circuit [2227] *2272* produces signal Sset for setting the number of hand drive pulses in register 2261, signal Sread for reading the data in up counter 2262 and signal Sreset for resetting register 2261 and up counter 2263.

When Sread is output, the gate Combination of invertor 2273 and AND gate 2274 inhibits the passage of hand drive reference clock Cdrv. It is then required to generate the signal Sreset for resetting register 2261 and four bit up counter 2262 after reading. Also, when identity detector circuit 2263 detects a coincidence between the contents of register 2261 and four bit up counter 2262, a motor control interrupt Mint signal is produced. When the motor control is generated, the software can read which interrupt has been generated and then reset in accordance with this read value.

Reference is again made to FIG. 3 in which trigger forming circuits 230, 231, 232 and 233 produce trigger signals Sat, Sbt, Sct, Sdt and Set, respectively, in response to the trigger signals output by respective motor clock control circuits 226–229 and the band drive mode control signals Sa, Sb, Sc, Sd and Se output by motor hand drive mode control circuit 219.

Figure 5:
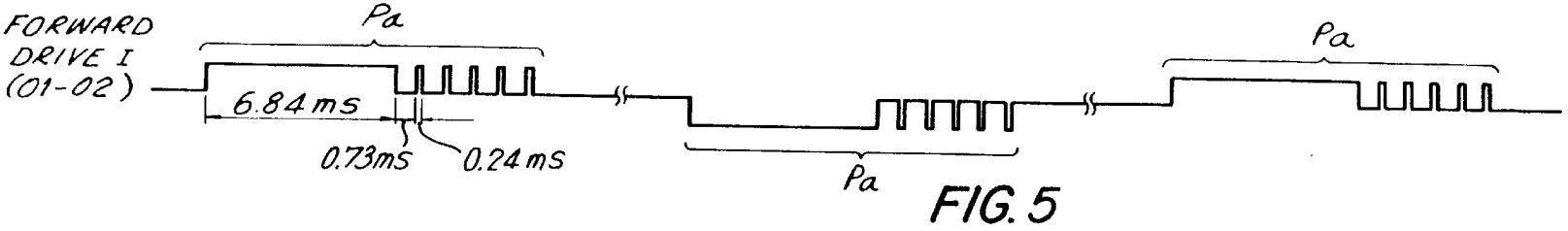
FIGS. 5–8 are timing charts of drive pulses produced by the driving pulse forming circuit constructed in accordance with the invention.
Figure 6:
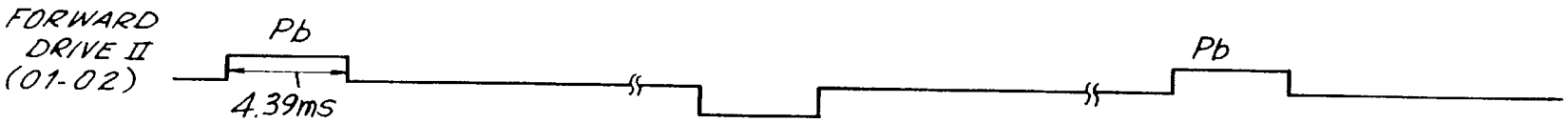
Figure 7:
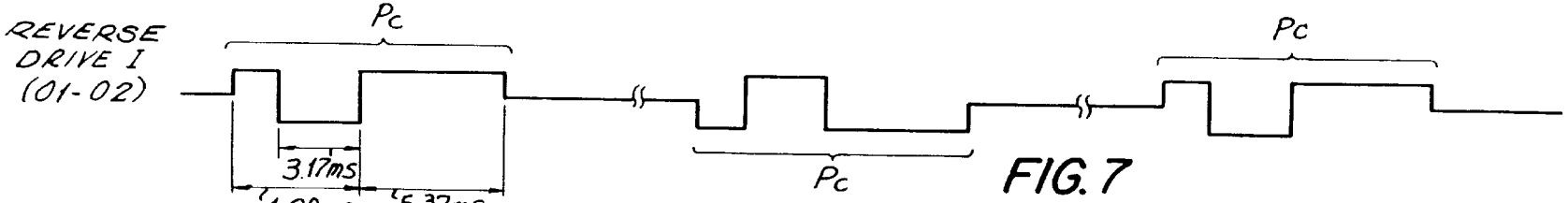
Figure 8:
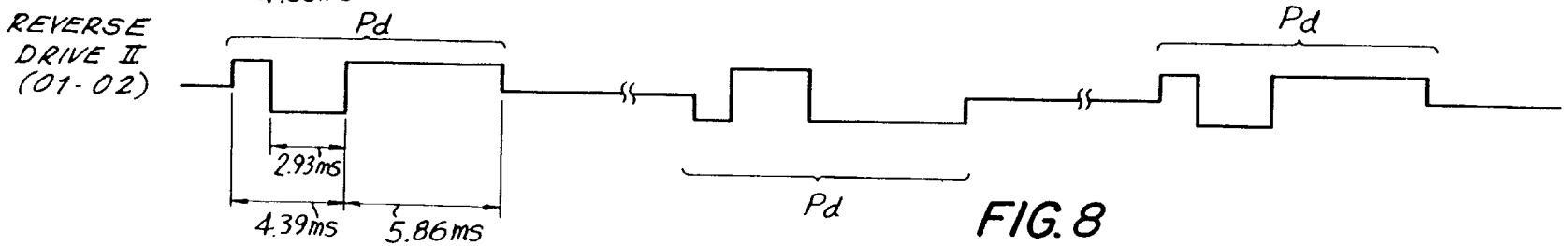
Figure 15:
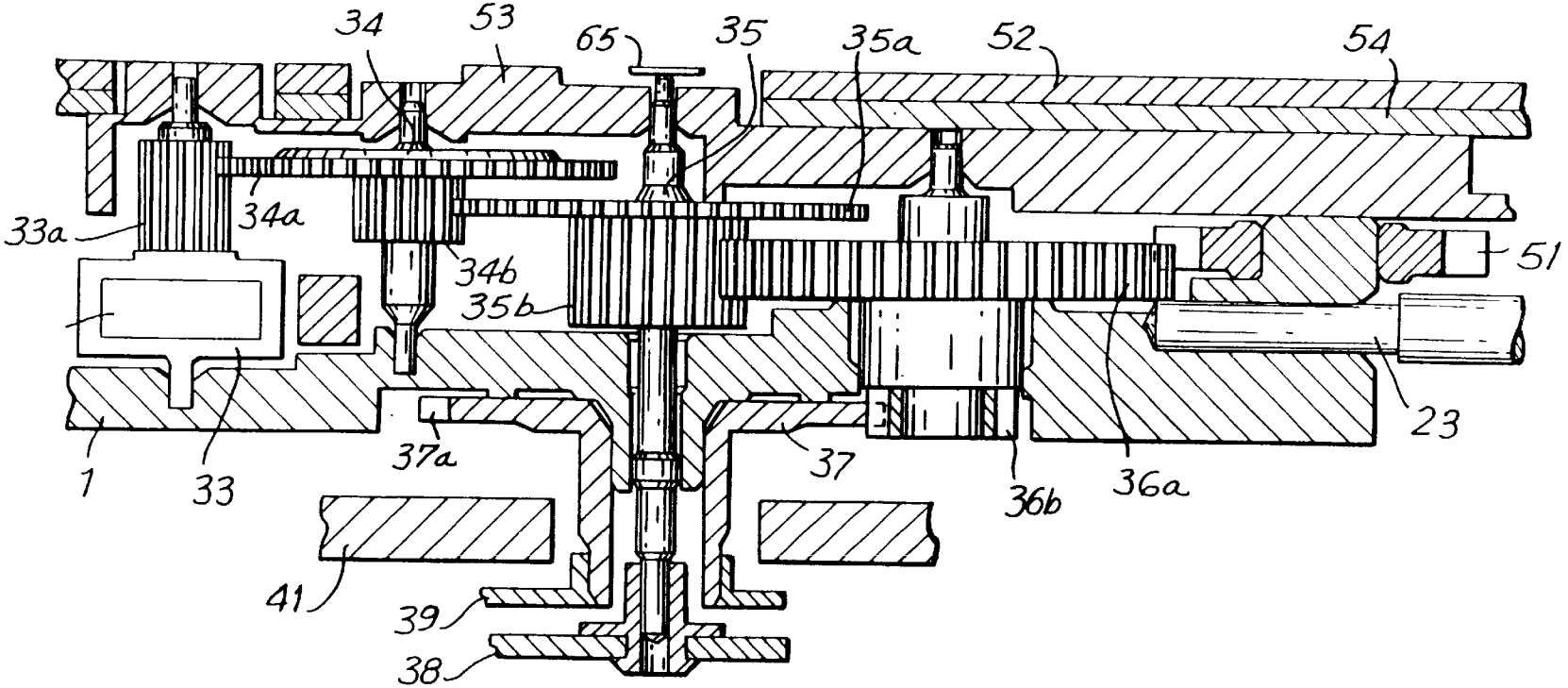
FIG. 15 is a sectional view of an alarm time setting wheel train.

A first drive pulse forming circuit [22] *221* receives trigger signal Sat and outputs drive pulses Pa for driving the step motors in the forward drive I mode as shown in FIG. 5. A second drive pulse forming circuit 222 receives trigger signal Sbt and outputs drive pulses [Pd] *Pb* for driving the step motors in the forward drive II mode as shown in FIG. 6. A third drive pulse forming circuit 223 receives an input of Sat and outputs drive pulse Pc for driving the step motors in the reverse drive I mode as shown in FIG. 7. A fourth drive pulse forming circuit [225] *224* receives trigger signal Sdt and outputs drive pulses Pd for driving the step motors in the reverse drive 11 mode as shown in FIG. 15.

A fifth drive pulse forming circuit 225 receives trigger signal Set and outputs pulses Pe for compensating motor driving by changing the pulse width in response to the load. Pulses Pe would include normal drive pulses P1, correction drive pulses P2, pulses P3 formed upon detection of the AC magnetic field, AC magnetic detection pulses Sp1 and rotation detecting pulses Sp2 as disclosed in Japanese Patent Laid-open No. 260883/85.

Motor drive pulse selectors 234, 235, 236 and 237 receive drive pulses Pa, Pb, Pc, Pd and Pe and control signals Sa, Sb, Sc, Sd and Se to output drive pulses necessary for the associated step motors. Motor drive pulse selector circuits 234, 235, 236, 237 select the appropriate pulses necessary for the associated step motor from the motor drive pulses Pa, Pb, Pc, Pd and Pe in response to drive mode control signals Sa, Sb, Sc, Sd and Se. Accordingly, motor drive pulse selector circuit A 234 produces a motor drive pulse PA, while motor drive pulse selector circuit B 235 produces a motor drive pulse PB, motor drive pulse selector C 236 produces a motor drive pulse PC and motor drive pulse selector circuit D 237 produces a motor drive pulse PD.

Returning particularly to FIG. 1, a motor driver A 213 receives input PA and provides motor drive pulses through terminals OA1, OA2 to a coil 3b of a step motor A 3. A motor driver [D] *B* 214 receives signal [PD] *PB* and produces a motor drive pulse through terminals OB1, OB2 to a coil 15b of a step motor B 15. Motor driver C 215 receives an input PC and Pf from chronograph circuit 211 and produces a motor drive pulse through terminals OC1, OC2 to a coil 27b of a step motor C 27. Motor driver D 216 receives an input PD and provides a motor drive pulse across output terminals OD1, OD2 to a coil 32d of a step motor D 32.

An input control and reset circuit 217 processes respective switch inputs applied through terminals A, B, C, D, RA1, RA2, RB1, RB2 and processes respective input applied through input terminals K, T and R. If an input is applied through any of switch terminals A, B, C, D or any one of switch terminals RA1, RA2 and RB1, RB2, a switch interrupt Swint is output. When this occurs, interrupt sources are read and reset in accordance with controls provided by the software. Each input terminal is normally brought to $V_{ss}$ and the data is set at 0 when in the open state and is set to 1 when connected to $V_{dd}$.

Terminal K is a specification switching terminal which allows the selection of either one of two types of specification as dependent on data applied at terminal K.[.]The reading of data at terminal K is executed under control of the software. Terminal R is a system reset terminal. When terminal R is connected to $V_{DD}$, core CPU 201, frequency divider circuits 208, 209 and the other peripheral circuits are initialized by the software.

Terminal T is a test mode conversion terminal. When the clock is input to terminal T with RA2 terminal kept connected to $V_{DD}$, the peripheral circuit can be tested in any one of 16 test modes. The principle test modes include a forward drive I verification mode, a forward drive II verification mode, a reverse drive I verification mode, a reverse drive II verification mode, a correction drive verification mode and a chronograph 1/100 second verification mode. In these verification modes, the relevant motor drive pulses are automatically issued to the output terminal of the respective motor drive pulses.

System reset can be effected with simultaneous application of switch inputs other than connecting terminal [R2] *RA2* to $V_{DD}$. The present integrated circuit is arranged so that a system reset may also be forcibly implemented by the hardware upon simultaneous input through inputs A and C, B and RA2, as well as through any one of A, B and C, RA2 and RB2. There is also a frequency divider circuit reset and a peripheral circuit reset as reset functions which can be processed by core CPU 201 under software control. When the peripheral circuit reset is performed, the frequency divider circuits are reset.

An interrupt control circuit 218 receives each interrupt signal, Tint, CGint, Mint, Swint and in response to software control inputs and an input from input control and reset signal forming circuit 217, prioritizes the respective interrupts. These include storage of the interrupts until reading, reset after reading with respective switching interrupts, chronograph interrupts and motor control interrupts: A constant voltage circuit 200 forms a low constant voltage of about 1.2 volts from the voltage of battery 2, about 1.58 volts, applied between $V_{DD}$ and $V_{SS}$ and then outputs to the $V_{s1}$ terminal.

By constructing an integrated circuit as described above for driving a step motor, an integrated circuit is provided which has motor drivers able to drive four step motors simultaneously. By including a motor hand drive mode control circuit, drive pulse forming circuit and motor drive pulse selector circuits the energizing of four step motors may be accomplished in any one of three forward drive modes and two backward drive modes, independently under the control of the software. Additionally, by providing a hand drive reference signal forming circuit the hand drive speed of each step motor can be freely changed. By providing four motor clock forming circuits corresponding to four step motors in a one to one relation, the number of hand drive pulses for driving each motor may be freely set under the control of the software.

Figure 10:
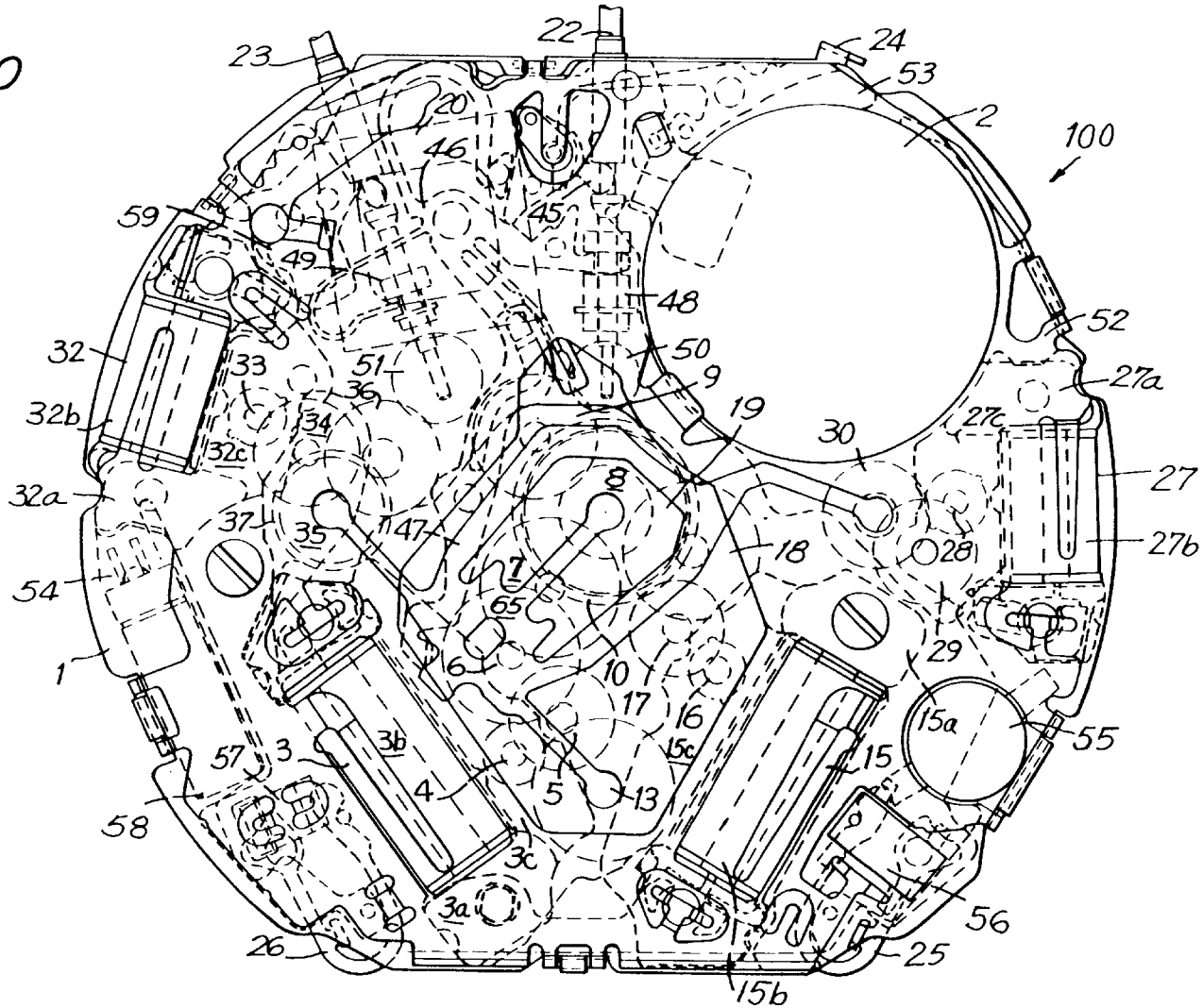
FIG. 10 is a top plan view of a multifunction analog electronic watch constructed in accordance with the invention.
Figure 11:
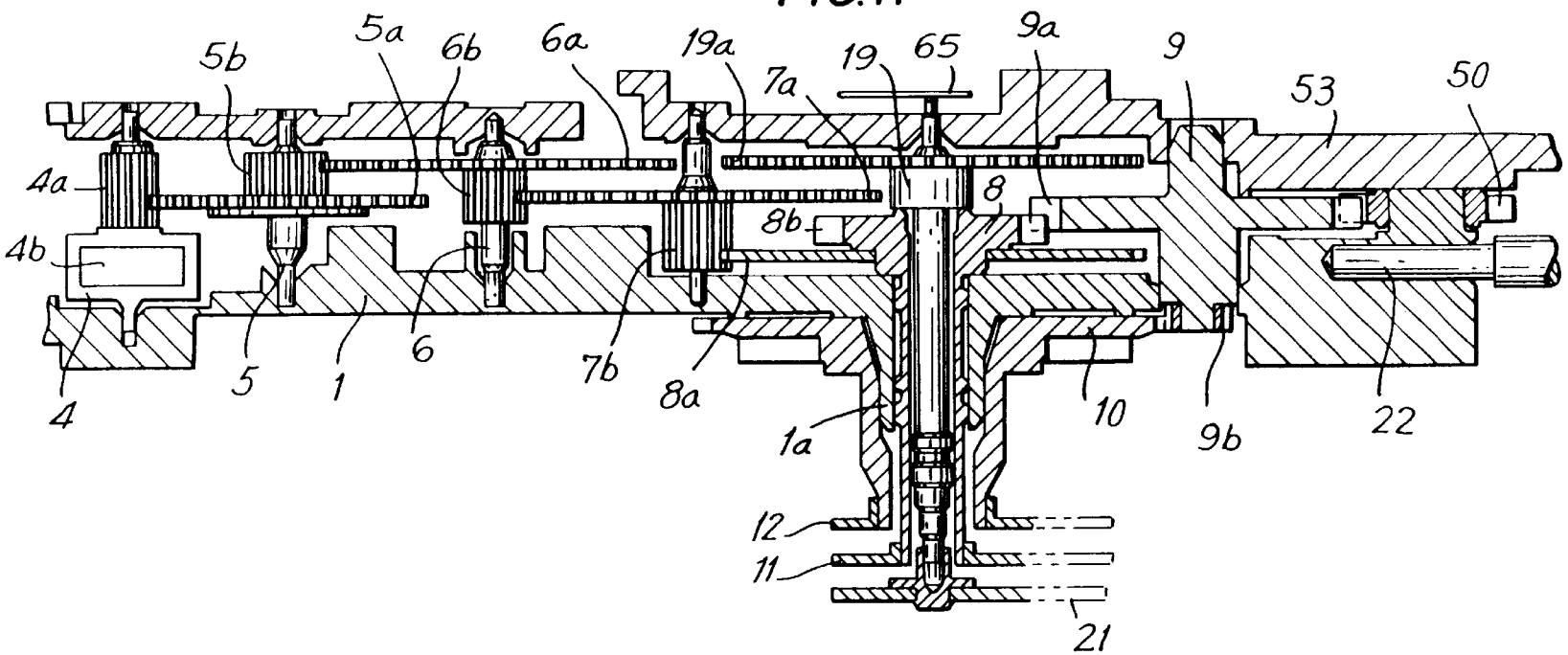
FIG. 11 is a sectional view of an hour and minute indicating wheel train constructed in accordance with the invention.

Reference is now made to FIGS. 10 and 11 of the drawings wherein a multifunction electronic analog watch, generally indicated at 100, and constructed in accordance with the invention, is depicted. Multifunction electronic analog watch 100 includes a main plate 1 formed of resin molding with a battery 2 supported thereon. A first step motor A 3 supported on main plate 1 drives the normal twelve hour time display indicators. Step motor A 3 has a coil core 3a of a highly permeable material. A coil block 3b is made of a coil wound around coil core 3a. Step motor A 3 also includes a coil frame and coil lead substrate having opposed ends subjected to terminal processing by conducting electricity. A stator 3c is formed of a highly permeable material. A rotor 4 is rotatably supported on main plate 1 and includes a rotor magnet 4b and a rotor pinion 4a.

A fifth wheel 5 including a fifth gear 5a and a fifth pinion 5b is rotatably mounted between main plate 1 and a wheel train bridge 53. Similarly, a fourth wheel 6 having a fourth gear 6a and a fourth pinion 6b, a third wheel 7 having a third gear 7a and a third pinion 7b and a second wheel 8 having a second gear 8a and a second pinion 8b are each rotatably mounted between main plate 1 and wheel bridge 53. Second wheel 8 is formed as two distinct parts; second gear 8a being friction fit about second pinion 8b. A minute wheel having a minute gear 9a and a minute pinion 9b is rotatably mounted between main plate 1 and wheel bridge 53 while an hour wheel 10 having an hour gear 10a is rotatably mounted about a projecting portion [la] *1a* of main plate 1.

As seen in FIG. 11, the wheels mesh with each other to form a wheel train for driving the normal twelve hour time hour and minute indicators. Rotor pinion 4a meshes with fifth gear 5a while fifth pinion 5b meshes with fourth gear 6a. Fourth pinion 6b meshes with third gear 7a and third pinion 7b in turn meshes with second gear 8a. Second wheel 8 and hour wheel 10 are positioned at the center of the watch. This wheel train arrangement is situated so that the minute and hour indication of normal twelve hour time is provided at the center of the watch movement.

A reduction in speed is realized between rotor 4 and second gear 8a. The speed reduction ratio of the wheel train is set at 1/1800. Thus, when rotor 4 is rotated at a speed of half a turn per second, second gear 8a is rotated once each 3,600 seconds, i.e. 360° each 60 minutes, enabling the indication of minutes for displaying normal twelve hour time. A minute hand 11 is fit over a distal end of second wheel 8 to provide the indication of elapsed minutes.

Additionally, second pinion 8b meshes with minute gear 9a and minute pinion 9b meshes with hour wheel 10. The speed reduction ratio realized from second pinion Bb to hour wheel 10 is set to be 1/12 to enable the indication of normal twelve hour time hours. An hour hand 12 is fit over a distal end of hour wheel 10 to indicate the hour of normal twelve hour time.

Figure 12:
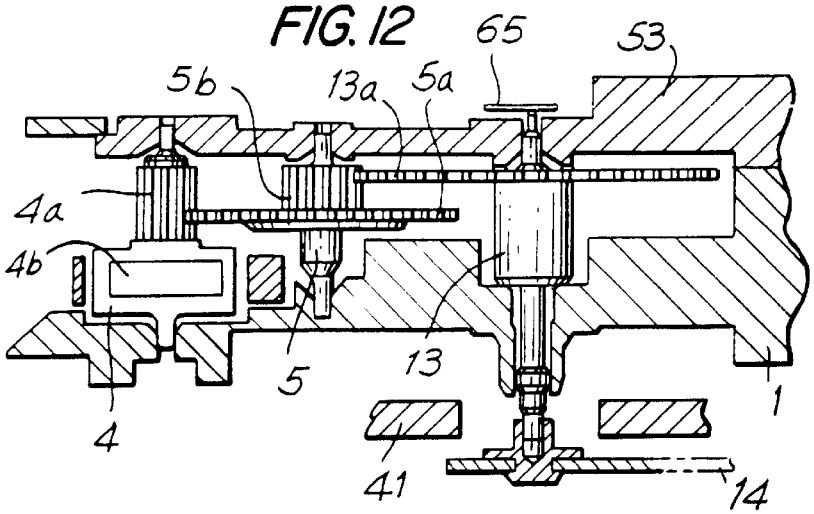
FIG. 12 is a sectional view of a second indicating wheel train.

Referring now more particularly to FIGS. 10 and 12, a spindle is disposed within timepiece 100 in the general position of nine o'clock of the movement. A small second wheel 13 having a gear 13a is disposed between the spindle and a second collar counter spring 65. Fifth pinion 5b meshes with small second gear 13a Utilizing the train wheel arrangement of rotor 4 and fifth wheel 5, small second wheel 13 may be driven to provide an indication of normal twelve hour time seconds at a position at nine o'clock of the timepiece movement.

Again, the speed is reduced between rotor 4b and small second wheel 13 to display real time seconds. The speed reduction ratio between rotor pinion 4a and small second gear 13a is set at 1/30. Accordingly, when rotor 4 is rotated at a rate of 180 per second, small second wheel 13 makes a full revolution each 60 seconds, i.e., small second gear 13a rotates through 6° per second, thereby enabling the indication of the seconds for displaying normal twelve hour time. A small second hand 14 is fit over a distal end of the small second wheel 13 to indicate real time seconds.

Figure 13:
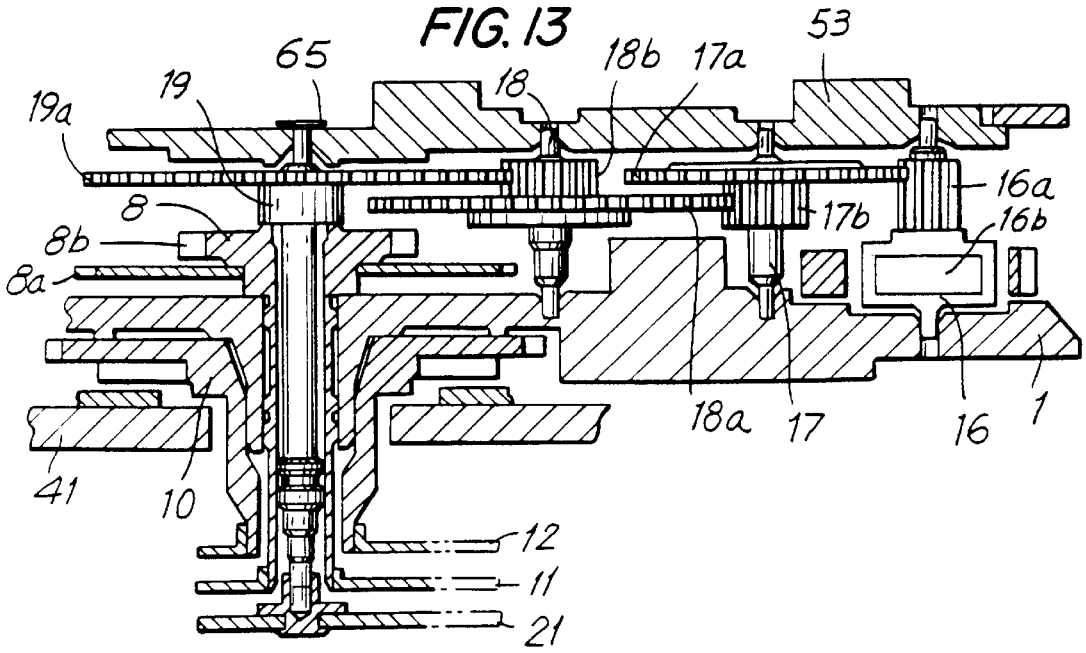
FIG. 13 is a sectional view of a chronograph seconds indicating wheel train.

Referring to FIG. [15]*10*, a second step motor B 15 is provided for driving a chronograph second indicator. Step motor B 15 includes a coil core 15a formed of a highly permeable material. A coil block 15b is formed of a coil wound around coil core 15a. A coil lead substrate mounted about a coil frame has its opposite ends positioned to be subject to electrical conduction. A stator 15c is formed of a highly permeable material. A rotor 16 mounted between main plate 1 and wheel train 53 includes a rotor magnet 16b and a rotor pinion 16a. As also shown in FIG. 13, a 1/5 second chronograph ("CG") first intermediate wheel 17 including a gear 17a and pinion 17b is rotatably mounted between main plate 1 and wheel bridge 53. Similarly, a 1/5 second CG intermediate wheel 18 having a second intermediate gear 18a and second intermediate gear 18b and a 1/5 second CG wheel 19 having a second CO wheel gear 19a are rotatably mounted between base 1 and wheel bridge 53.

Wheels 17, 18 and 19 mesh to form a wheel train for driving the chronograph second indicator. Rotor pinion 16a meshes with 1/5 second CG first intermediate gear 17a and 1/5 second CO first intermediate pinion 17b meshes with 1/5 second CG second intermediate gear 18a. 1/5 CG second intermediate pinion 18b meshes with 1/5 second CG gear 19a. 1/5 second CG wheel 19 is positioned at the center of the timepiece movement. With the above train arrangement, chronograph second indication is given at the center of the timepiece movement.

Again, the rotational speed is reduced between rotor 16 and 1/5 second CG wheel 19. The speed reduction ratio provided by the wheel train extending from rotor pinion 16a to 1/5 second CG gear 19a is set at 1/150.

Integrated circuit chip ("CMOS-IC") 20 for controlling the operation of electronic timepiece 100 is mounted on main plate 1. CMOS-IC 20 produces an electric signal rotating rotor 16 through 180° each 1/5 seconds. 1/5 second CG wheel 19 is rotated at a speed of 1.2° per fifth of a second, i.e., it rotates 1.2 by five steps each second, enabling the indication of chronograph seconds in units of 1/5 seconds. A 1/5 second CG hand 21 is fit over a distal end of 1/5 second CG wheel 19 to indicate the passing of chronograph seconds. 1/5 second CG hand 21 also serves as a timer setter hand for setting the timer time period.

Figure 14:
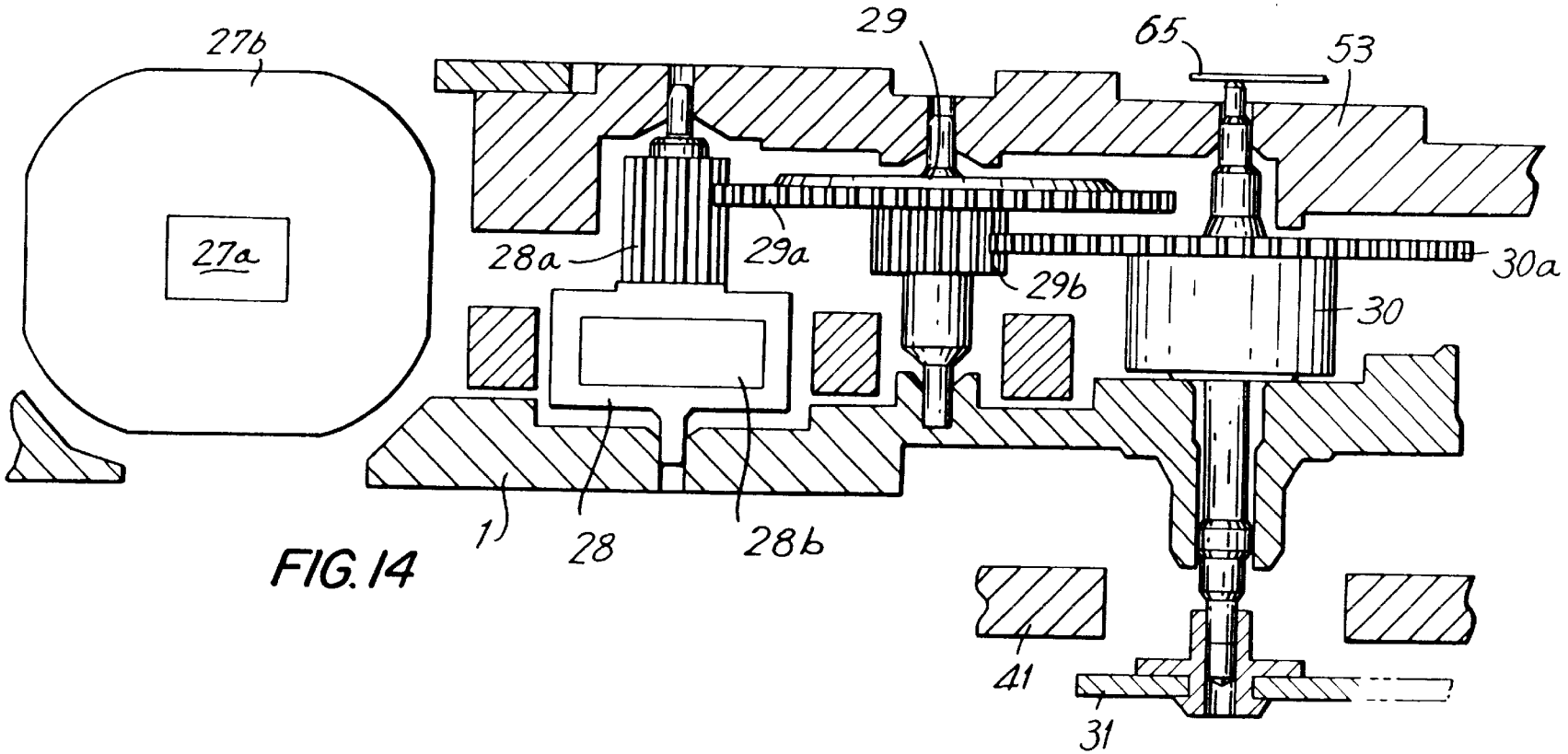
FIG. 14 is a sectional view of a chronograph minute and elapsed timer second indicating wheel train.

Reference is now made more particularly to FIG. 14 wherein a third step motor C 27 drives the indicator for indicating chronograph minutes and an indication of timer elapsed time seconds. Step motor C 27 includes a coil core 27a formed of a highly permeable material and a coil block 27b formed by a coil wound around coil core 27a. A coil lead substrate having opposite ends operated on by conducting electricity through the terminals thereof is provided along with a coil frame. A stator 27c formed of a highly permeable material is magnetically coupled to a rotor 28 having a rotor magnet 28b and a rotor pinion 28a.

A minute CG intermediate wheel 29 having an intermediate gear 29a and intermediate pinion 29b is rotatably supported between wheel bridge 53 and main plate 1. A minute CG wheel 30 having a minute CG gear 30a is disposed in a spindle located at the twelve o'clock position of the watch movement and supported by second collar counter spring 65. Rotor pinion 28a of rotor 28 meshes with minute CG intermediate gear 29a. Minute CG intermediate pinion 29b meshes with minute CG gear 30a providing a wheel train for the indication of chronographic minutes and elapsed time timer seconds. The train wheel construction allows both the chronograph minute indication and the timer elapsed time second indication to be performed on a spindle located at the twelve o'clock position of the watch movement.

The speed is reduced between rotor pinion 28a and minute CG gear 30a The speed reduction ratio is set at 1/30.

When multifunction electronic analog watch 100 is in a chronograph mode, CMOS-IC 20 produces an electric signal causing rotor 28 to be rotated at a rate 360° minute, i.e. 180° times two steps. Therefore, minute CG wheel 30 rotates at a rate of 12° per minute, making a 360° rotation in thirty minutes enabling a chronographic minute indication of a thirty minute time period.

A minute CG hand 31 is fit over a distal end of minute CG wheel 30 to provide chronograph minute indication. Minute CG hand 31 working in combination with 1/5 second CG hand 21 permits chronograph indications ranging from a minimum readout of 1/5 seconds to a maximum readout of 30 minutes.

When in an elapsed time timer mode, CMOS-IC 20 provides an electric signal causing rotor 28 to be rotated in a direction opposite to the direction of rotation performed in the chronograph mode. The rotation of rotor 28 advances at a rate of 180° by one step per second. Minute CG hand 31 is rotated counterclockwise in one second units, thereby giving an indication of timer elapsed time seconds based upon one turn each sixty seconds.

Simultaneously. CMOS-IC produces an electric signal causing rotor 16 to rotate in a direction opposite to the chronographic mode at a rate of 180° by five steps per minute. Therefore, 1/5 second CG hand 21 is rotated counterclockwise at a rate of 6° per minutes giving the indication of timer elapsed minutes. The timer setting may be adjusted using a second winding stem 23 supported on main plate 1. When second winding stem 23 is held at a first step, each push of a switch B 25 rotates rotor 16 through 180° by five steps and 1/5 second CG hand 21 6° (1 minute on the timepiece dial). Then, the elapsed time timer can be set within a maximum range of sixty minutes.

Reference is now made to FIGS. 10 and 15 wherein a step motor D 32 supported on main plate 1 drives the indicators for indicating the alarm ("AL") setting time. Step motor D 32 comprises a coil core 32a made of a highly permeable material. A coil block 32b is formed by a coil wound around coil core 32a. A coil frame and a coil lead substrate are provided, the coil lead substrate having opposite terminal ends subject to electric conductivity. A stator 32c is formed of a highly permeable material. A rotor 28 including a rotor pinion 33a and a rotor magnet 33b is rotatably supported on main plate 1.

An alarm intermediate wheel 34 having an intermediate wheel gear 34a and intermediate wheel pinion 34b and AL minute wheel 36 having an AL minute wheel gear 36a and AL minute wheel pinion 36b are rotatably supported between main plate and wheel bridge 53. AL center minute wheel 35 having an AL center minute gear 35a and an AL center minute pinion 35b and AL hour wheel 37 having an AL hour wheel gear 37a are supported on a spindle located at the six o'clock position of the timepiece movement.

The above wheels form a wheel train providing an alarm setting and time indication on the spindle located at the 6 o'clock position of the timepiece movement. As seen in FIG. [6]*15*, rotor pinion 33a meshes with AL intermediate wheel gear 34a and AL intermediate wheel pinion 34b in turn meshes with AL center minute wheel gear 35a. AL center minute pinion 35b meshes with AL minute gear 36a and AL minute pinion 36b in turn meshes with AL hour wheel 37.

To control movement of the alarm setting time indicators, the wheel train reduces the rotation speed transmitted from rotor pinion 33a to AL center minute wheel gear 35a. The speed reduction ratio provided between AL center minute gear 35a and rotor pinion 33a is 1/30 while the speed reduction ratio provided by the wheel train from AL center minute wheel pinion 35b to AL hour wheel gear 37 is set to be 1/12. An AL minute hand 38 is fit over a distal end of AL center minute wheel 35 and an AL hour hand 39 is fit over a distal end of hour wheel 37.

The alarm time setting indicator is operated by setting a second winding stem 23 to a first step placing electronic timepiece 100 in an alarm ON mode. CMOSIC 20 provides an electric signal causing rotor 33 to be rotated through 180° each time a switch C 26 is pushed. Correspondingly, AL minute hand 38 is rotated through 6°, one minute on the dial, and AL hour hand 39 rotates through 0.5°. Therefore, the alarm time can be set between a range of one minute and 12 hours. By continuing to push switch C 26, AL minute hand 38 and AL hour hand 39 continuously run at an accelerating speed, so that the alarm time may be set in a short time. When the alarm setting time as indicated by AL minute hand 38 and AL hour hand 39 coincide with the indicated normal 12 hour time, an alarm is sounded. When second winding stem 23 is set to the zero step, electronic timepiece 100 is in an alarm OFF mode in which the AL minute hand 38 and AL hour hand 39 indicate the normal 12 hour time. When this occurs. CMOS-IC 20 produces an electric signal causing rotor 33 to be rotated through 180 per minute. Accordingly, the AL minute hand 38 is driven in minute unit increments.

Figure 16:
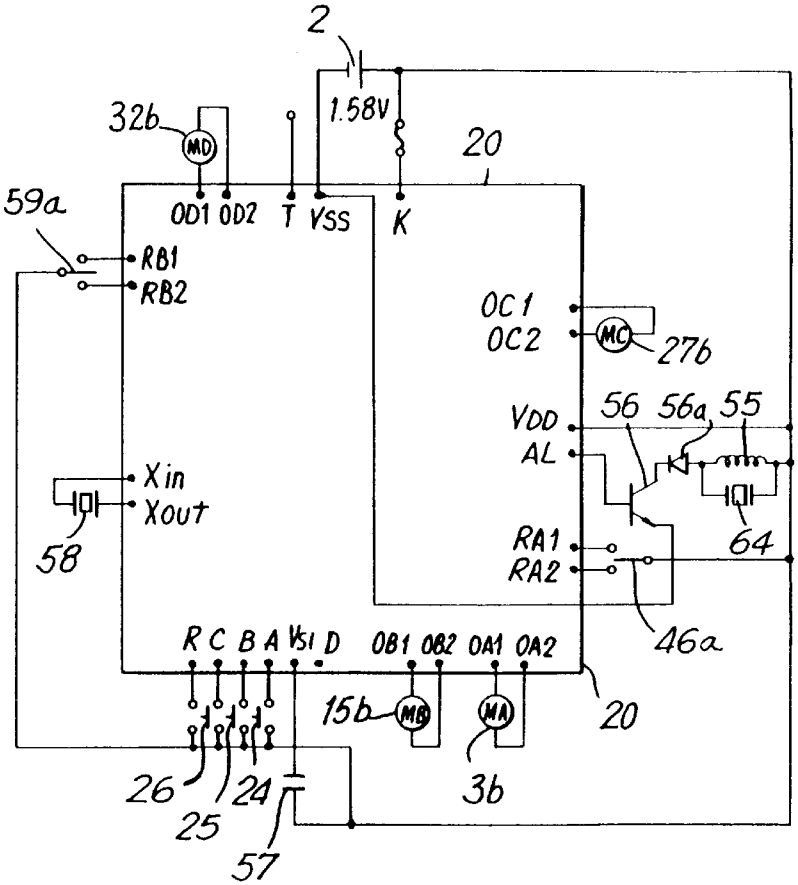
FIG. 16 is a schematic diagram of a multifunction electronic timepiece constructed in accordance with the invention.

Reference is now made to FIG. 16 in which a circuit diagram of the connection between CMOS-IC 20 and other electric elements of electronic timepiece 100 are provided. Silver oxide cell battery 2 provides power to CMOS-IC 20 at a terminal $V_{SS}$. Coil block 3d of step motor A 3 is coupled to CMOS-IC 20 at terminals OA1, OA2. Coil block 15b of step motor B 15 is coupled to CMOS-IC 20 at terminals OB1. OB2. Switch A 24. switch B 25 and switch C 26 are connected at input terminals A, B and C respectively. Coil block 27b of step motor C 27 is coupled to CMOS-IC 20 at terminals OC1, OC2. Coil block 32b of step motor D 32 is coupled at terminals OD1, OD2. A booster coil 55 provides an input to a minimolded transistor 56 having a protector diode 56a and are coupled to terminal AL for energizing a piezoelectric buzzer 64 connected across booster coil 55. Piezoelectric buzzer 64 is mounted on the back-case of the watch. A F chip capacitor 57 is coupled to CMOS-IC 20 for suppressing voltage fluctuations of a constant voltage circuit built within CMOS-IC 20. A tuning fork type micro-crystal oscillator 58 is coupled to CMOS-IC 20 at terminals $X_{in}$, and $X_{out}$ to provide a source for an oscillator circuit built in CMOS-IC 20. A switch 46a formed in a potion of yolk 46 (FIG. [1] *10*) is coupled to CMOS-IC 20 between terminals RA1, RA2. A switch 59a formed in a portion of second setting lever 23 is coupled to CMOS-IC 20 between terminals RB1, RB2.

Switches 24. 25 and 26 are each push button type switches that allow a user to apply an input therethrough only when they are pushed. Switch 46a is a switch which interlocks with first winding stem 22 and is positioned so that terminal RA1 is closed when first winding stem 22 is set in its first step and closes terminal RA2 when winding stem 22 is in its second step. Switch 46a is opened when winding step 22 is at a normal position. Switch 59a acts in cooperation with second winding stem 23 and is arranged so that it closes terminal RB1 when second winding stem 23 is in a first step encloses terminal RB2 when stem 23 is at its second step. Switch 59a is open when stem 23 is set at a normal position.

Figure 17:
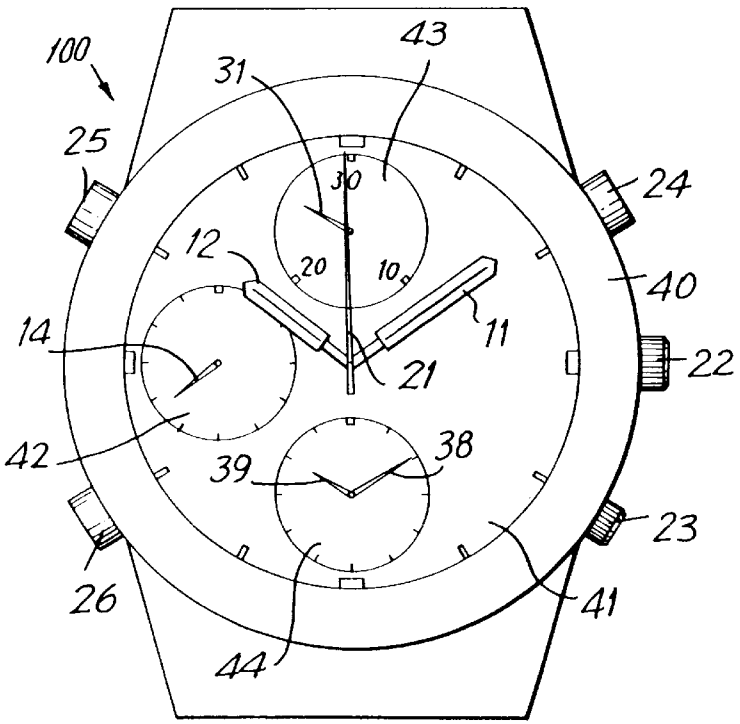
FIG. 17 is a plan view of a face of a multifunction analog electronic timepiece constructed in accordance with the invention.

Reference is now made to FIG. 17 wherein a top plan view of multifunction electronic analog watch 100 is provided. Multifunction electronic analog watch 100 includes a bezzle case 40 and a dial 41 provided within bezzle case 40 to provide a watch face. An area 42 of dial 41 provides indication of normal 12 hour time seconds. An area 43 of dial 41 indicates chronograph minutes and the elapsed seconds of the timer. An area 44 of dial 41 provides indication of the alarm setting time. Normal 12 hour time is indicated utilizing small second hand 14 driven in units of seconds, minute hand 11 and hours hand 12 as described above.

Adjustment of the normal 12 hour time is made by withdrawing first winding stem 22 to the second step. As shown in FIG. 10, in this position, fourth wheel 6 is restricted by the train wheel setting lever 47 which engages with setting lever 45 and yoke 46, stopping rotor 4 to suspend drive motion of small second hand 14. On rotating the first winding stem about its axis, winding torque is transmitted to minute wheel 9 through a sliding pinion 48 and a setting wheel 50. Because second gear 8a is slideably coupled to second pinion 8b, setting wheel 50, minute wheel 9, second pinion 8b and hour wheel 10 are all rotatable even when fourth wheel 6 is restricted in motion. Accordingly minute hand 11 and hour hand 12 can be rotated allowing the user to set those hands to any desired time.

Figure 18A:
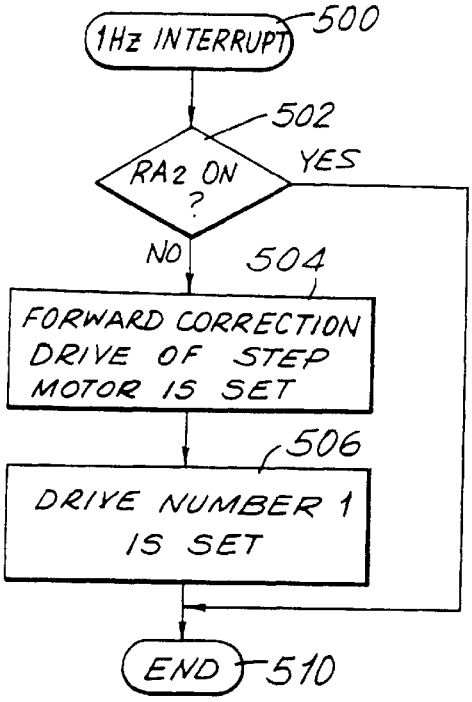
FIGS. 18a, 18b are flowcharts for the indication of normal twelve hour time.
Figure 18B:
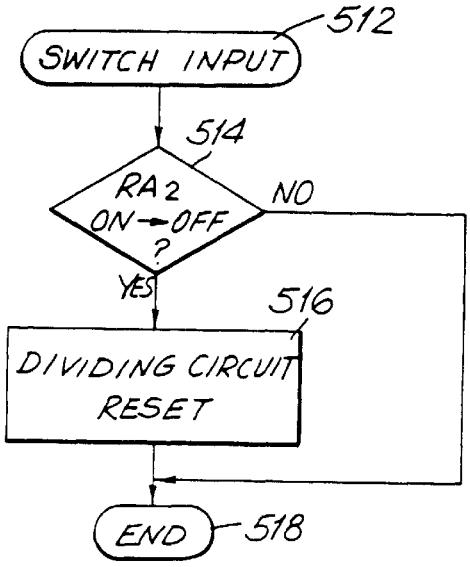

Reference is now made to FIG. 18a, *18b* in which a flow chart for indicating normal twelve hour time by electronic timepiece 100 is provided. A 1 Hz interrupt is input in accordance with a step 500 causing CPU 201 to determine whether switch 46a is OFF or ON at terminal RA2 in a step 502. If switch 46a is OFF at terminal RA2, then a forward compensation driving control signal for step motor A 3 is output by motor hand drive mode control circuit 219 of motor drive control circuit 212 and a forward correction drive for motor A 3 is performed in a step 504. In a step 506, the number of hand drive pulses is set to 1 in the motor clock control circuit A 226.

If switch 46a is on at terminal RA2, such as in a time correction state, then the motor driving is stopped in accordance with a step 510. If switch 46a is on a terminal RA2 and there is a switch input in a step 512, such as during a time correction state, then switch 46a is turned OFF at terminal RA2 in accordance with a step 514. Both frequency divider circuit 208 and 209 are then instantaneously reset so that the motor will be driven after a one second interval in accordance with a step 516.

Figure 19B:
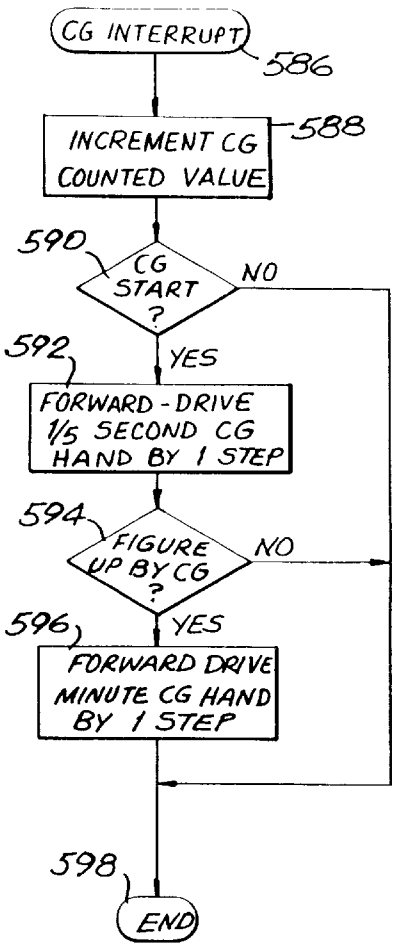
FIGS. 19a, 19b are flowcharts for the chronographic operation of the electronic timepiece.
Figure 19A:
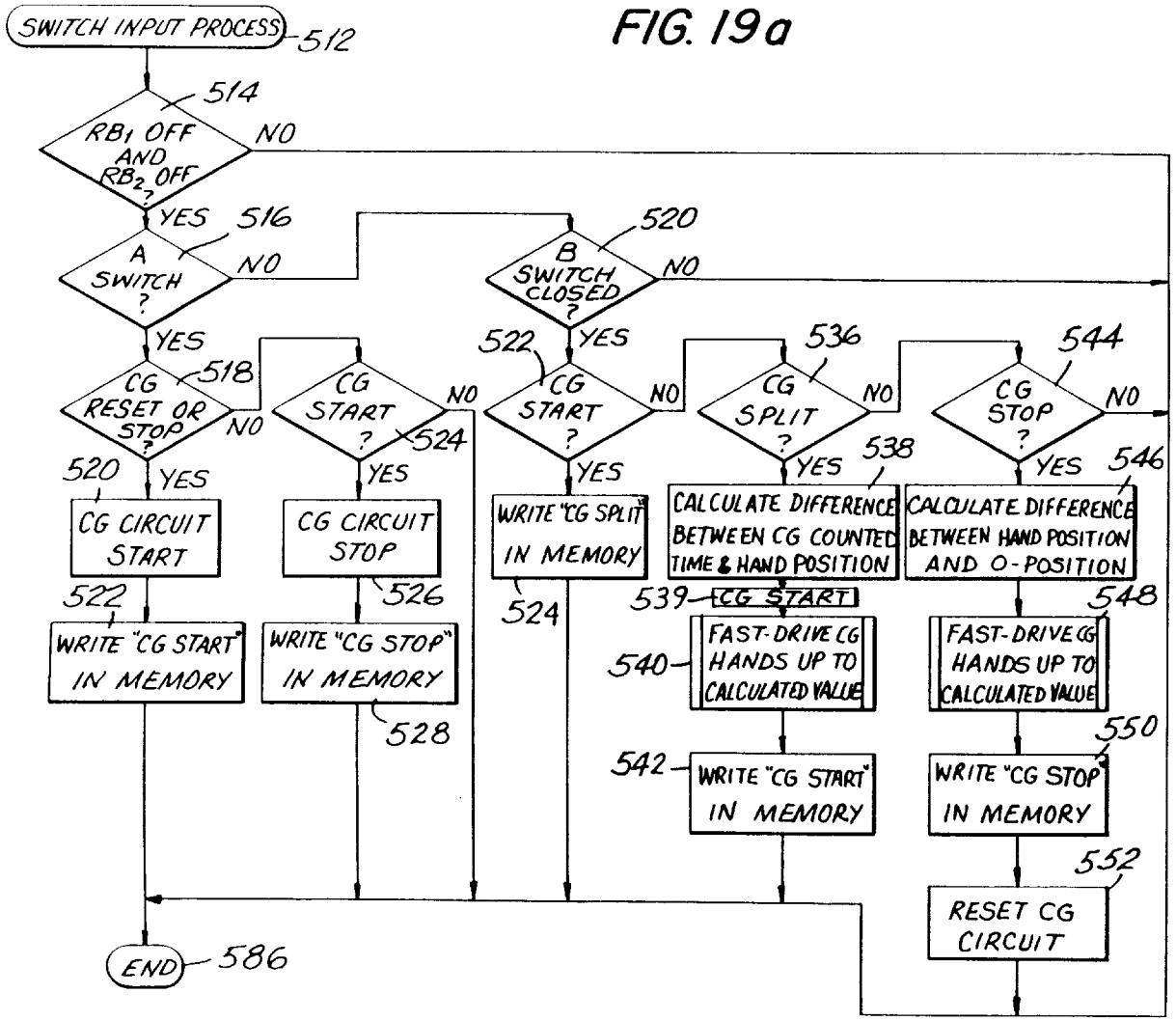

Reference is now made to FIGS. 19a, 19b in which a flow chart for operating the electronic analog timepiece 100 in a chronographic mode is provided. In these flow charts "CG START" indicates the state in which time counting occurs and a split signal has been produced. Second winding stem 23 is set at its normal position operating switch 59a in accordance with a step 512 so that switch 59a is OFF at both terminals RB1, RB2 in accordance with a step 514. This places electronic analog timepiece 100 in a chronographic mode. By depressing switch A in a step 516, the chronograph may be ultimately stopped or reset in a step 518 or started in a step 524. If the chronograph has been stopped or reset the chronograph circuit is started in a step 520 and the occurrence of "CG start" representing the state in which the chronograph counts time and the split indication is generated within chronograph circuit 211 is written within data memory 204 in a step 522.

To start a chronograph counting a CG interrupt signal CGint is produced by chronograph circuit 211 in a step 586. Upon each CG interrupt, the CG 1/5 second counter formed in a portion of data memory 204 is incremented by 1 in a step 588. The chronograph count and the split command are again produced in accordance with a step 590. 1/5 second CG Hand 21 is driven forward by one step equal to one fifth of a second in a step 592. It is determined whether the 1/5 second counter has counted one minute in a step 594. Whenever the 1/5 second counter has counted one minute, a CG minute counter also formed in a portion of data memory 204 is incremented by one and CG hand 31 is driven forward one minute in a step 596. Upon completion of the process, the process is ended in a step 598. CG circuit 211 is stopped in a step 526 and "CG stop" is written in the memory in step 528.

If the B switch is activated in a step 520 then the chronograph again enters the CG start status in a step 522 and writes "CG split" in the memory in a step 524. If the B switch is activated and the electronic analog timepiece 100 is only in split status in accordance with a step 536, the difference between the chronograph counted time and the hand position is calculated in a step 538. A CG start mode is produced in a step 539 to fast drive both the 1/5 second CG hand 21 and a minute CO hand 31 to indicate the calculated value which is the counted time in a step S40. The "CG start" is then written in data memory 204 in a step 542.

If the B switch is applied when electronic analog timepiece 100 is not in a chronographic time counting mode, such as when chronographic function has stopped in a step 544, then chronographic time counting is reset. The difference between the chronographic hand position and the 0-position or a reference position is calculated in a step 546. The respective CG hands are fast driven to the indicated 0-position in a step 548 as will be shown later in the flowchart of FIG. 22. "CG start" is written in memory 204 in a step 550 and the chronographic circuit 211 is reset in a step 552.

Figure 20B:
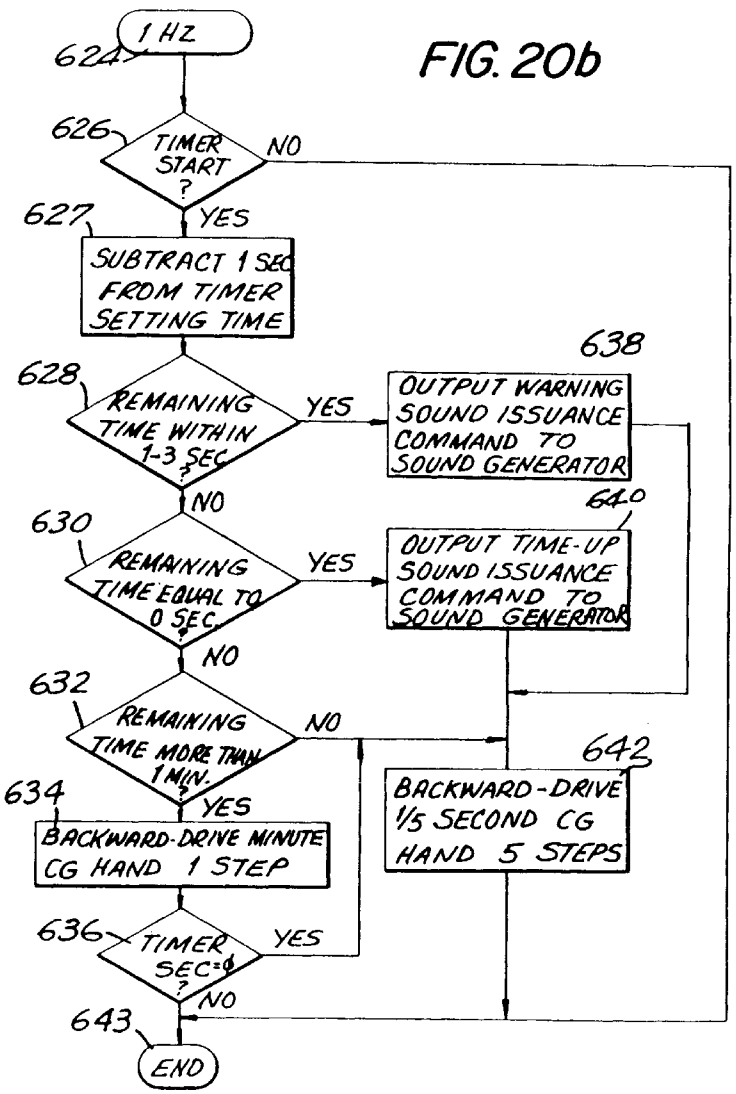
FIGS. 20a, 20b are flowcharts for the timer operation of the analog electronic timepiece.
Figure 20A:
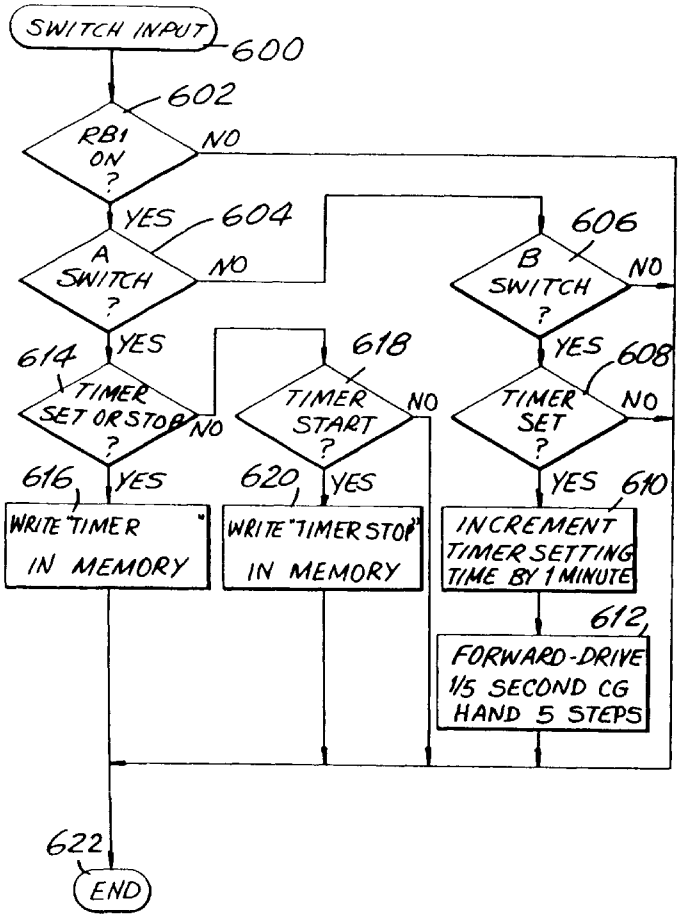

Reference is now made to FIGS. 20a, 20b in which a flowchart for operating electronic analog timepiece 100 in an elapsed timer mode is provided. The timer must first be set to the desired time period. The timer setting is indicated by the 1/5 second CG hand 21. Second winding stem 23 is set to a first step to activate switch 59a in a step 600 so that switch 59a is on at the RB1 terminal in a step 602. When switch 59a has been turned on at terminal RB1, electronic analog timepiece 100 is in the timer mode. When switch B is activated in a step 606 during a timer setting in step 608, the timer setting time is incremented by one minute in a step 610. The 1/5 second CG hand 21 is driven forward by one minute or five step increments in a step 612. The graduations 41a of dial 41 indicated by the 1/5 seconds CG hand 21 represents the timer setting time period. The timer setting time period may be set to a value as great as sixty minutes.

Activation of switch A 24 starts and stops a timing processes in accordance with a step 604. The timer function is started in a step 618, and an interrupt signal is provided in a step 624. To start the timer in a step 626, the minute CG hand 31 is driven counterclockwise in units of minutes and 1/5 second CG hand 21 moves to subtract one second from the timer setting time in a step 627. It is determined whether the time remaining on the timer is more than one minute in a step 632. If the remainder timer time is greater than one minute and the minute CG hand 31 is driven backwards step in a step 634. When a timer time period is set at more than one minute or the remaining time period is less than one minute as determined in a step 636, the minute CG hand 31 is stopped and the 1/5 CG hand 21 is driven backwards to count down the elapsed time in the unit seconds in a step 642.

It is determined whether the time remaining in the elapsed time period is within a range of one to three seconds in a step 628. If the remaining time falls in this range an output warning sound issuance command is output to sound generator 210 in a step 638 and the 1/5 second CG is continued to be driven backwards in a step 642. When the remaining time is determined to equal zero seconds in a step 630, a time sound issuance command is output to sound generator 210 in accordance with step 640. The output stops in accordance with a step 643. Once an elapsed time period has been completed, the "timer stop" is written in data memory 204 in a step 620. Additionally, it is determined whether the timer is set or stopped in a step 614. If the timer is set or stop the "timer start" is stored in data memory 240 in a step 616. The timer operations ends in a step 622.

Figure 21A:
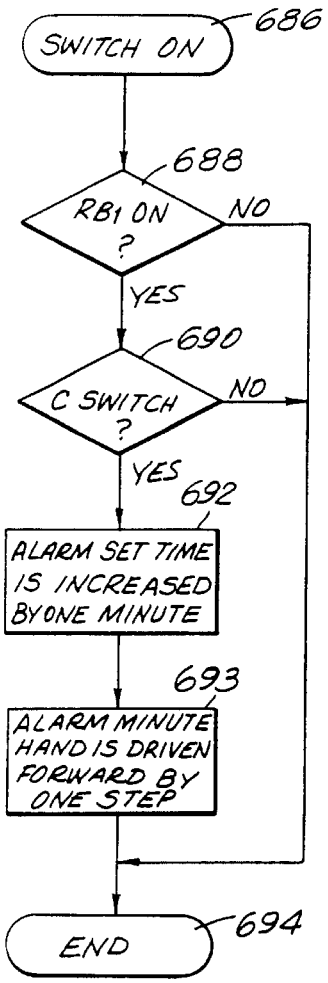
FIGS. 21a, 21b, 21c are flowcharts for the alarm operation of the multifunction analog electronic time piece.
Figure 21B:
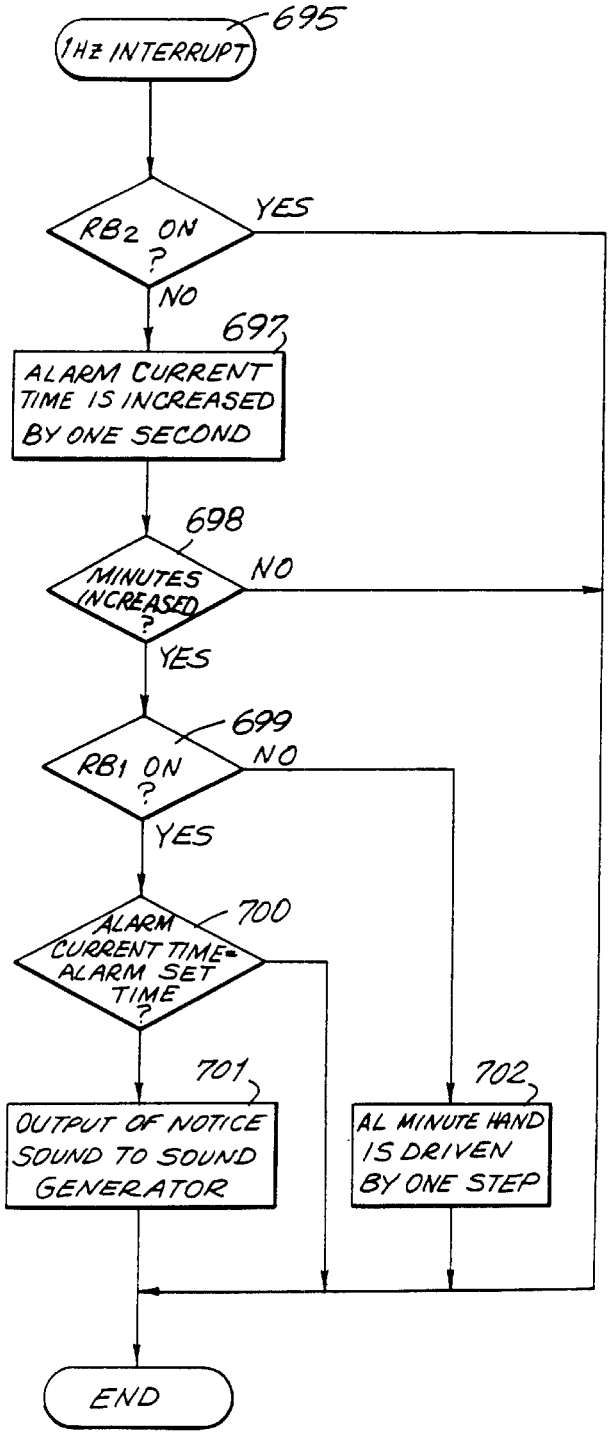
Figure 21C:
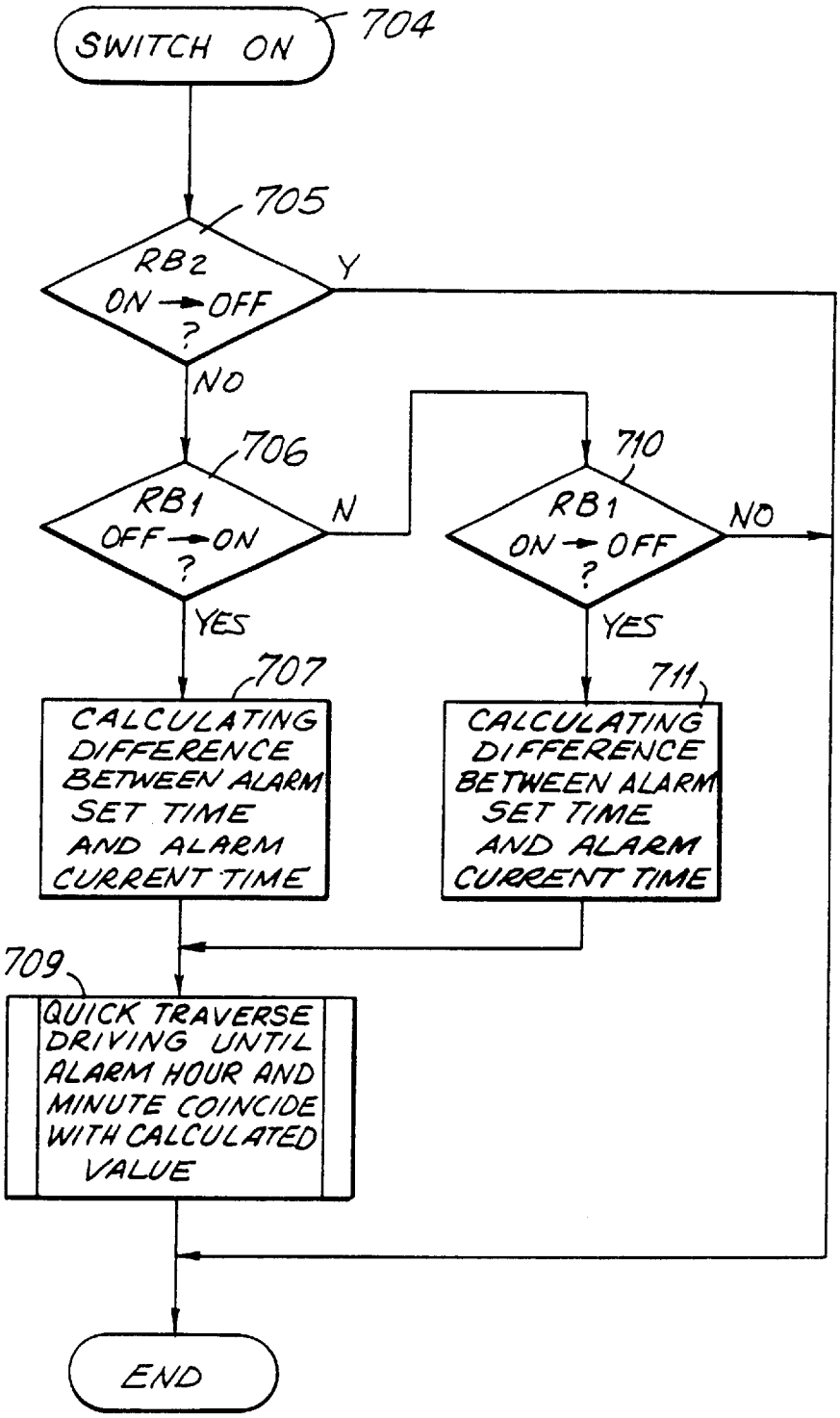

Reference is now made to FIGS. 21a–21c in which flowcharts for operating the alarm mode of multifunctional electronic analog watch 100 are depicted. The alarm setting time is indicated on area 44 of dial 41 of multifunctional electronic analog watch 100. As shown in FIG. 21a, second stem 23 is switched on to the first stage in step 686 which switches terminal RB1 ON which is determined in a step 688. It is determined whether or not switch C26 is turned on in step 690. If switch [C26] *C 26* is turned on then AL [minute hand 38 and AL hour hand 39 are driven forward] *set time is incremented* by one minute [increments] in a step 692. AL minute hand 38 is then driven forward by one step in a step 693. If switch [C26] *C 26* is continuously pushed, the AL minute hand 38 and the AL hour hand 39 are advanced at an accelerated rate thus shortening the alarm setting time.

As shown in FIG. 21b an interrupt signal is provided to the alarm in step 695. It is then determined whether terminal RB2 is ON or OFF in a step 696. If terminal RB2 is OFF, the time shown at area 44 corresponds to the current 12 hour time. The current 12 hour time displayed at area 44 ("alarm current time") is then increased by one second in a step 697. It is determined whether the minutes value has increased in a step 698. If the minutes value has increased second stem 31 is then put in the zero step and it is determined whether terminal RB1 is ON in a step 699. If terminal RB1 is OFF, the AL minute hand 38 is increased by one step in a step 702. If the RB1 terminal is ON, it is determined whether or not the current time is equal to the alarm set time in a step 700. If the two times are equal then a signal is output to sound generator 210 in a step 701 indicating the occurrence of the alarm set time.

As seen in FIG. 21c when second stem 23 is switched in a step 704 from the zero step to the first step, it is determined whether terminal RB2 has been switched from ON to OFF in a step 705. If terminal RB2 has not been switched to OFF, it is determined whether or not terminal RB1 has been switched from OFF to ON in step 706. If terminal RB1 has not been switched from OFF to ON, it is determined whether or not terminal RB1 has been switched from ON to OFF in a step 710. If terminal RB1 has been switched from ON to OFF then the difference between the alarm set time and the alarm current time is calculated in a step 711 and AL minute hand 38 and AL hour hand 39 are automatically quick driven to the time indicated by the value obtained by subtracting the alarm current time from the alarm set time in a step 709. The display then indicates the alarm set time rather than the alarm current time. When second stem 23 is changed from the first step to the zero step, and RB1 is switched from OFF to ON, the difference between the alarm set time and alarm current time is determined in a step 707 and AL hour hand 39 is automatically quick driven to the time value which is obtained by subtracting the alarm set time from the alarm current time in a step 709. The display then indicates the current alarm time rather than the alarm set time.

Figure 22A:
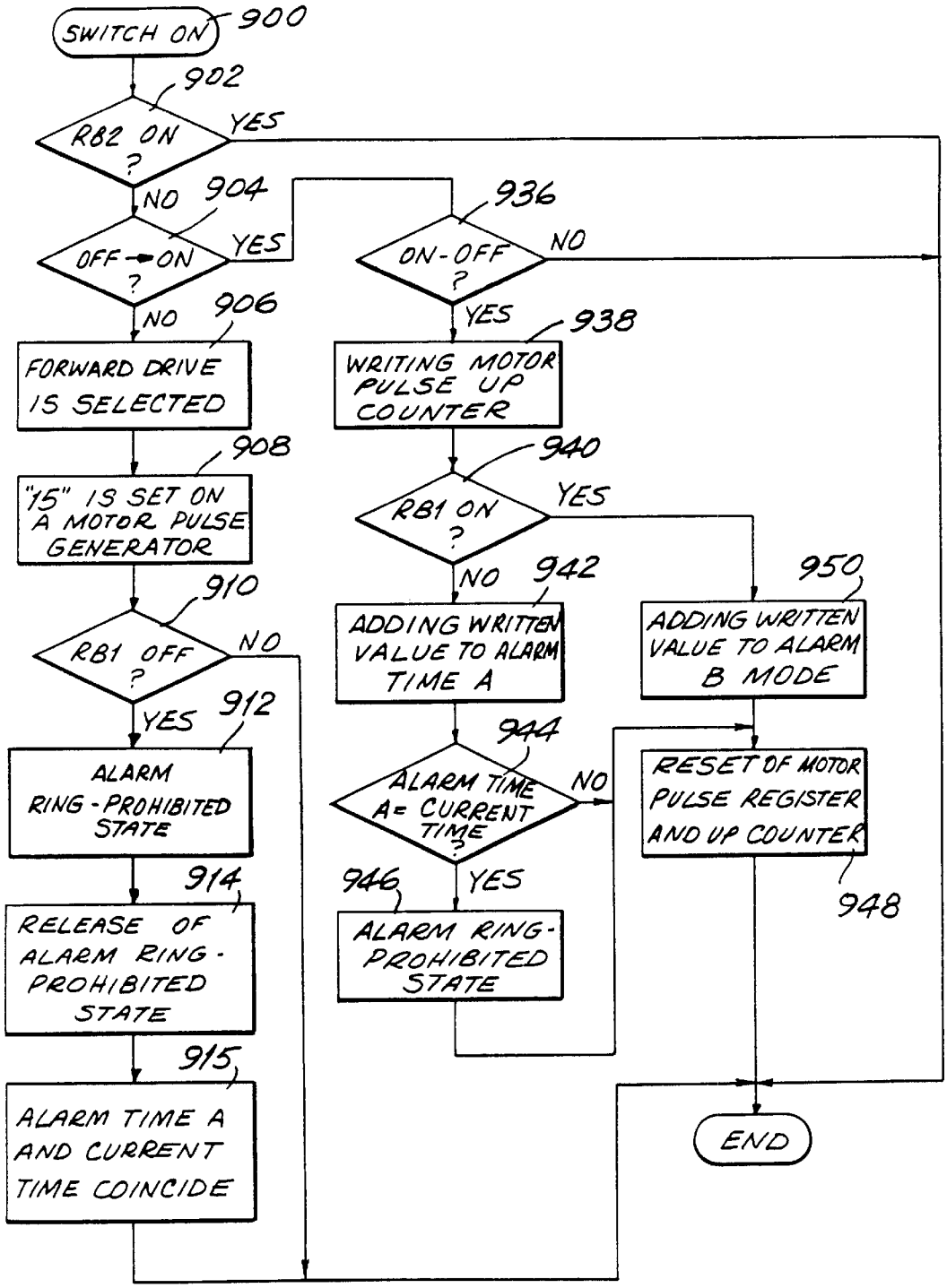
FIGS. 22a, 22b and 22c are flowcharts for the alarm operation of the multifunction analog electronic timepiece in accordance with another embodiment of the invention.
Figure 22B:
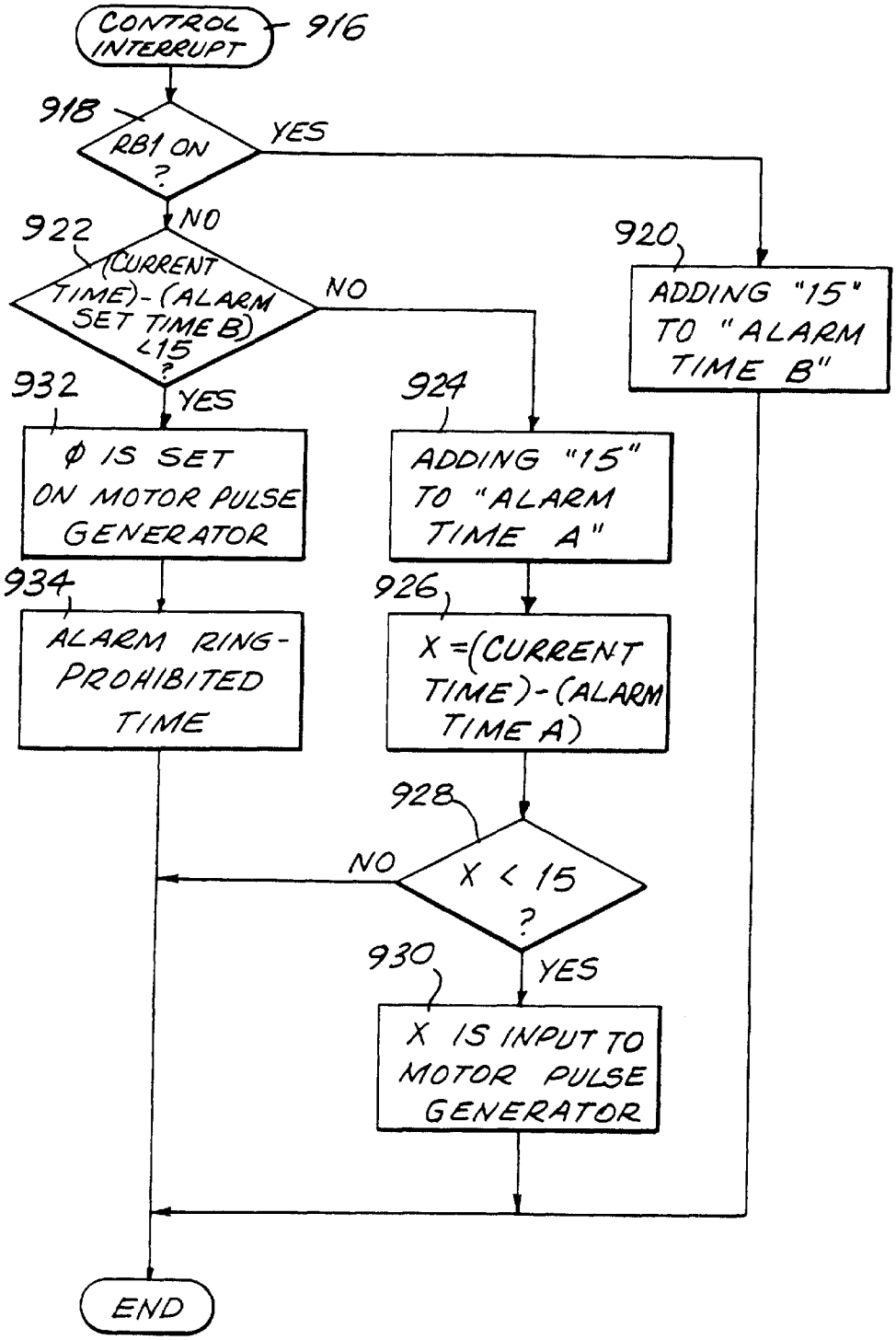
Figure 22C:
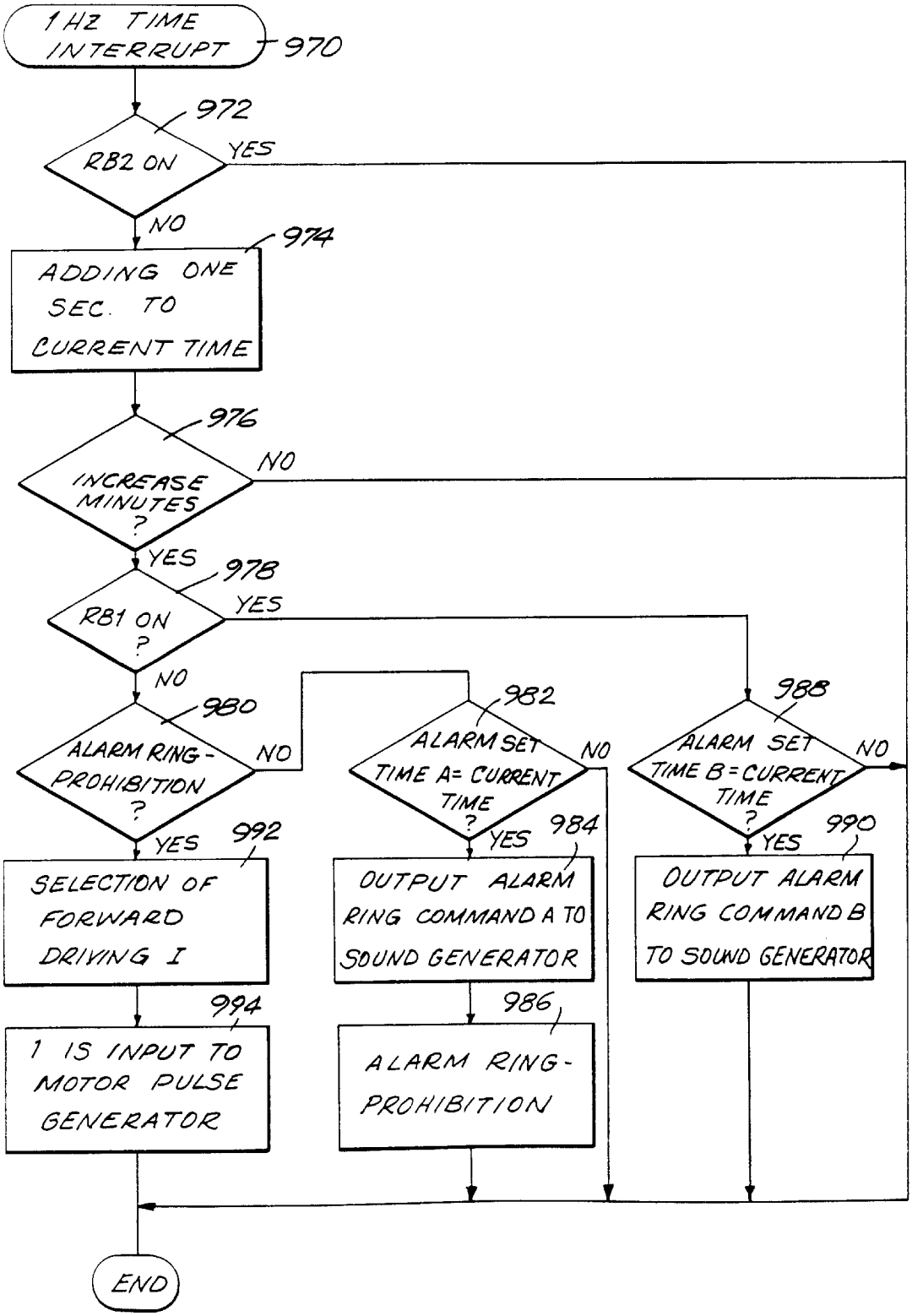

Reference is now made to FIGS. 22a–22c in which the functioning of the alarm to operate two separate alarm modes in accordance with another embodiment of the invention is provided. As seen in FIG. 22a when switch [C26] *C 26* is pushed in a step 900, while the second stem 23 is kept in the zero step or the first step it is then determined whether terminal RB2 is ON in a step 902.

When stem 23 is kept in the zero step or the first step, terminal RB2 is turned OFF. It is determined whether or not RB2 has been turned from OFF to ON at a step 904. When RB2 is turned OFF, forward drive 11 is selected by motor driving pulse selecting circuit [D237] *D 237* in accordance with instructions from CPU in a step 906. The value 15 is set in a register of trigger generating circuit [D233] *D 233* (hereinafter "motor pulse register") in a step 908 and a quick driving correction of the alarm hour/minute hands has begun. In an alarm mode A, that is, when second stem 23 is kept at the zero step, it is determined whether or not RB1 is OFF in a step 910. When terminal RB1 is OFF, the alarm is inoperative and therefore is in an alarm activating prohibited state in a step 912. The beginning of the alarm set time correction is set at the alarm set time and the alarm ringing prohibited state is converted to an alarm set state in a step 914. The alarm set time of mode A and the current 12 hour time then correspond to each other in a step 915.

When a motor pulse is generated [15] *15* times, a control interrupt is generated by trigger generating circuit [D233] *D 233* in a step 916 as shown in FIG. 22b. When the control interrupt is generated it is then determined whether terminal RB1 is ON in a step 918. If the terminal is ON then the value [15] *15* is added to an alarm time B of an alarm mode B in a step 920 and the value [15] *15* is re-input into the motor pulse register during the alarm mode B, thus continuing alarm time correction.

If terminal RB1 is not ON as determined in step 918, then the alarm is in the alarm mode A. It is then determined whether the difference between the current ordinary 12 hour time and the alarm set time A is greater than 15 in a step 922. If the difference determined in step 922 is greater than 15, 15 is added to the alarm time in A in a step 924. The difference between the current time and the alarm time is then recalculated in a step 926 and if the result is less than 15 as determined in a step 928 the value is set in the motor pulse generator in a step 930. In this method, because the alarm hour/minute hands indicate the current time the next control interrupt is generated and a zero is input to the motor pulse generator in a step 932. Correction is interrupted and alarm ringing is prohibited in a step 934 and the alarm set state is cleared.

As seen in FIG. 2c to ring both alarm mode A and alarm mode B, a 1 Hz interrupt signal is first counted in a step 970. It is determined whether terminal RB2 is ON in a step 972. If it is determined that terminal RB2 is OFF then 1 second is added to the current time in a step 974 and it is determined whether this addition to the seconds value has increased the minutes value in a step 976. If the minutes value has been increased it is determined whether terminal RB1 is on in a step 978. If terminal RB1 is ON then it is determined whether the alarm set time for alarm mode B is equal to the current time in a step 988. If the alarm set time does equal the current time than an output alarm ring command for alarm mode B is output to sound generator 210 in a step 990 to indicate the occurrence of alarm set time B.

If however, it is determined that terminal RB1 is OFF in step 978 it is then determined whether the watch is in alarm ring prohibition state in a step 980. If the watch is not in the alarm ring prohibition state then it is determined whether the alarm set time of alarm mode A is equal to the current time in a step 982. If the alarm set time or alarm mode A does equal the current time then an alarm ring command is output to sound generator 210 in a step 984 and the watch is then put into an alarm ring prohibition state for alarm mode A in a step 986.

If it is determined that the watch does not have an initial alarm ring prohibition state in step 980 then the alarm is not rung and the alarm AL minute hand 38 is driven in one minute increments through the selection of forward driving mode 1 in a step 992. A value of 1 is input to the motor pulse generator in a step 994. Accordingly, in the alarm A mode, alarm ringing is prohibited and the alarm set state is released once the alarm has been rung.

Returning to FIG. 22a, when switch C *26* is turned from ON to OFF in a step 936, an up counter 2262 ("motor pulse up counter") ends the quick driving of AL minute hand 38. Inputs are written into motor pulse up counter 2262 in a step 938. It is then determined whether terminal RB1 is in the ON state in a step 940. When terminal RB1 is OFF, the AL minute hand 38 has been advanced by a value calculated from the time when the previous control interrupt was generated in a step 942. Therefore a correction is made for the advancing of the time indication. Then, in alarm mode A mode when the alarm time and current time are determined to coincide in a step 944, the ringing of the alarm is prohibited in a step 946 so that the alarm is not set. The motor pulse register and up counter are then reset in a step 948. If terminal RB1 is determined to be ON at step 940 then the value is added to the alarm mode B in a step 950 and the motor pulse register and up counter are reset in a step 948.

In the embodiment described above, the alarm controlling means controls the current time, the alarm set time A and the alarm set time B, each having an absolute value. However, a relative value may be given for controlling the alarm set time as the difference between the alarm set time A and the current time and the difference between the alarm set time B and the current time. Additionally, in the embodiment the controlling means utilizes CPU 201. However, a logic circuit may be substituted for CPU 201. A correction of the ordinary time is carried out by turning the second stem 23 while in the second step. AL clutch 49 and AL setting wheel 51 shown in FIG. 10 are coupled to second stem 23 and correct the 12 hour ordinary time display.

Figure 23A:
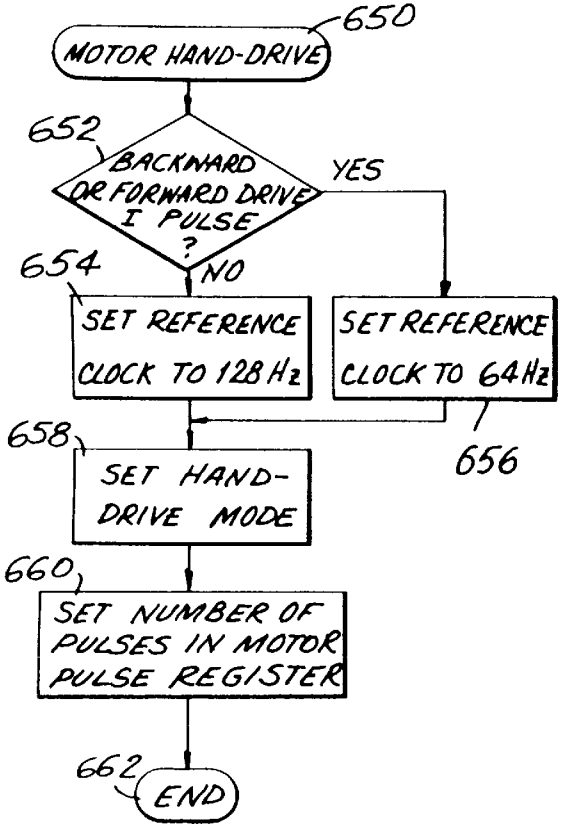
FIGS. 23a, 23b, 23c are flowcharts for the driving the hand of the multifunction analog electronic timepiece.
Figure 23B:
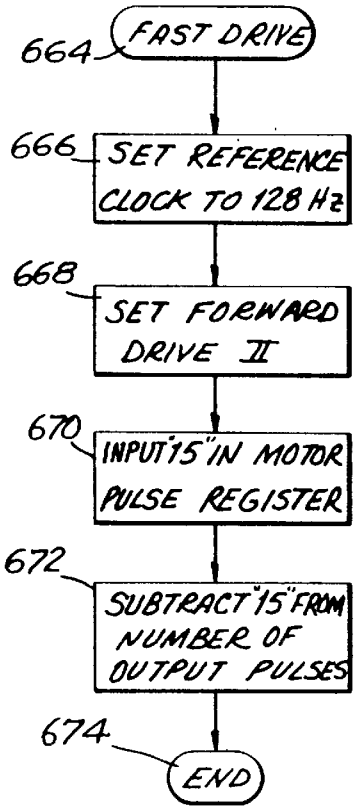
Figure 23C:
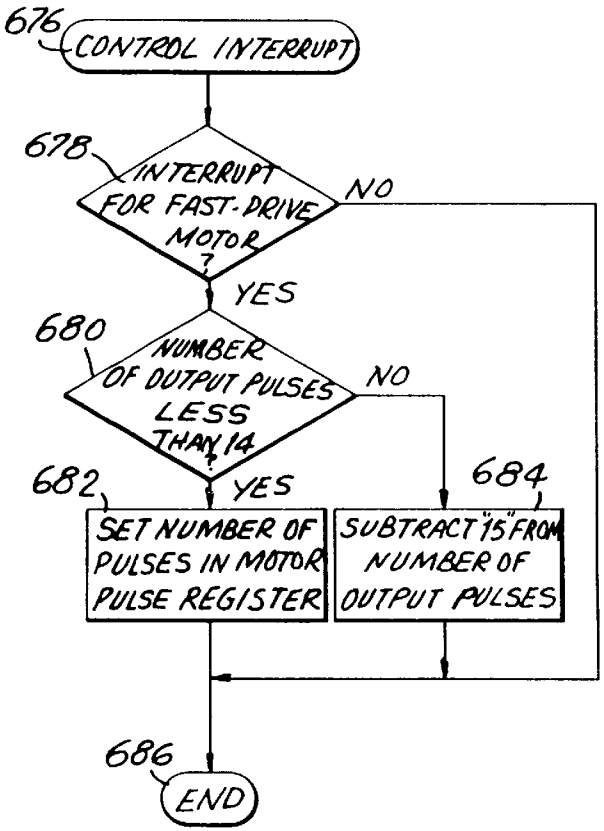

Reference is now made to FIGS. 23a–23c in which flowcharts for motor driving the indicator hands of a multifunction electronic analog watch 100 are depicted. FIG. 23a illustrates a hand drive method when the number of drive pulses applied to the motor, as counted by the all 1's detector, is less than 14. The motor hand drive are driven in a normal mode in accordance with the step 650. It is determined whether reverse or forward drive 1 pulses are being produced in a step 652. If these pulses are being produced the reference clock is set to 64 Hz in a step 656. The hand drive mode is then set in step 658 and a number of pulses in register 2261 is set in a step 660. If no backward or forward drive pulses are detected in step 652, the reference clock is set to 128 Hz to perform fast driving in accordance with a [method] *step* 664.

To perform fast driving, control interrupt is provided in a step 676 to interrupt operation to allow interrupt of the fast drive motor in a step 678. During operation of the fast drive motor it is determined whether the number of output pulses is larger than 14 in a step 680. If the number of pulses is less than 14, then the number of pulses is input to motor pulse register 2261 in a step [662] *682*. If the number of pulses is greater than 14, 15 pulses are subtracted from the number of output pulses in a step 684. The reference clock Cdrv is set to 128 Hz in a step 666 accelerating motor driving. A forward drive II is input in a step 668 and fifteen pulses are input into register 2261 in a step [667] *670*. Fifteen pulses are then subtracted from the number of output pulses in a step 672.

By providing a multifunction analog electronic watch which utilizes an IC as well as software loaded in a program memory, a watch which is more adaptable to various function specifications is provided. Additionally, software can be developed within one half to one third the period of time in which a new random logic IC which performs the same functions can be developed, thus considerably shortening the period in which the entire IC is developed. Accordingly, when changes in the functions specification occur or functions are added during development, the software can be easily modified to adapt to such a watch thus providing an IC for analog electronic watches which are capable of satisfying diversified watch designs and watch functions to meet consumer demands.

Figure 24:
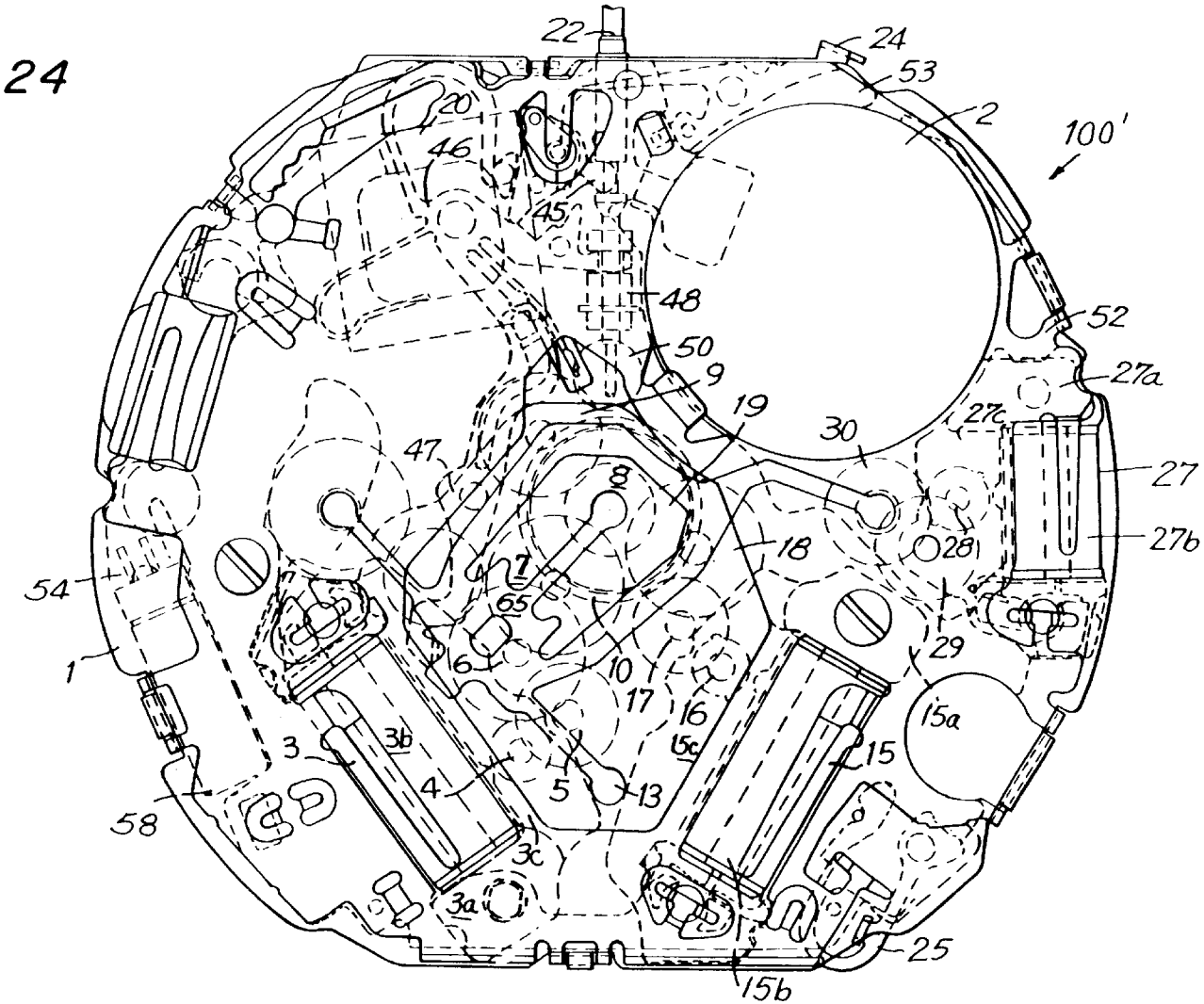
FIG. 24 is a top plan view of a multifunction analog electronic watch constructed in accordance with a second embodiment of the invention.

Reference is now made FIG. 24 wherein a second embodiment of a multifunction electronic analog watch, generally indicated at 100', constructed in accordance with the invention is provided. Like structures are indicated with like numerals, the difference in embodiments being that in multifunction electronic analog watch 100' three step motors are utilized to provide multifunction operation.

Step motor D 32 has been removed from electronic analog watch 100 along with the alarm function and timer function. Additionally, AL intermediate wheel 34, AL minute wheel 35, AL minute wheel and pinion 36, AL hour wheel and pinion 37, second stem 23, AL hour wheel and pinion 37, second stem 23, AL drum wheel 49, AL pinon 51, switch [C26] *C 26* and second setting lever 59 are also removed as not being required for analog electronic watch 100' which does not have the alarm function. Further, in watch 100 a small wheel 13 was positioned on an axis at the nine o'clock position of the watch movement. Accordingly, the twelve hour time seconds were indicated at that position. However, in multifunction electronic analog watch 100' small second wheel 13 is positioned on an axis at the six o'clock position of the watch movement, thereby indicating the twelve hour seconds at the six o'clock movement position.

Figure 25:
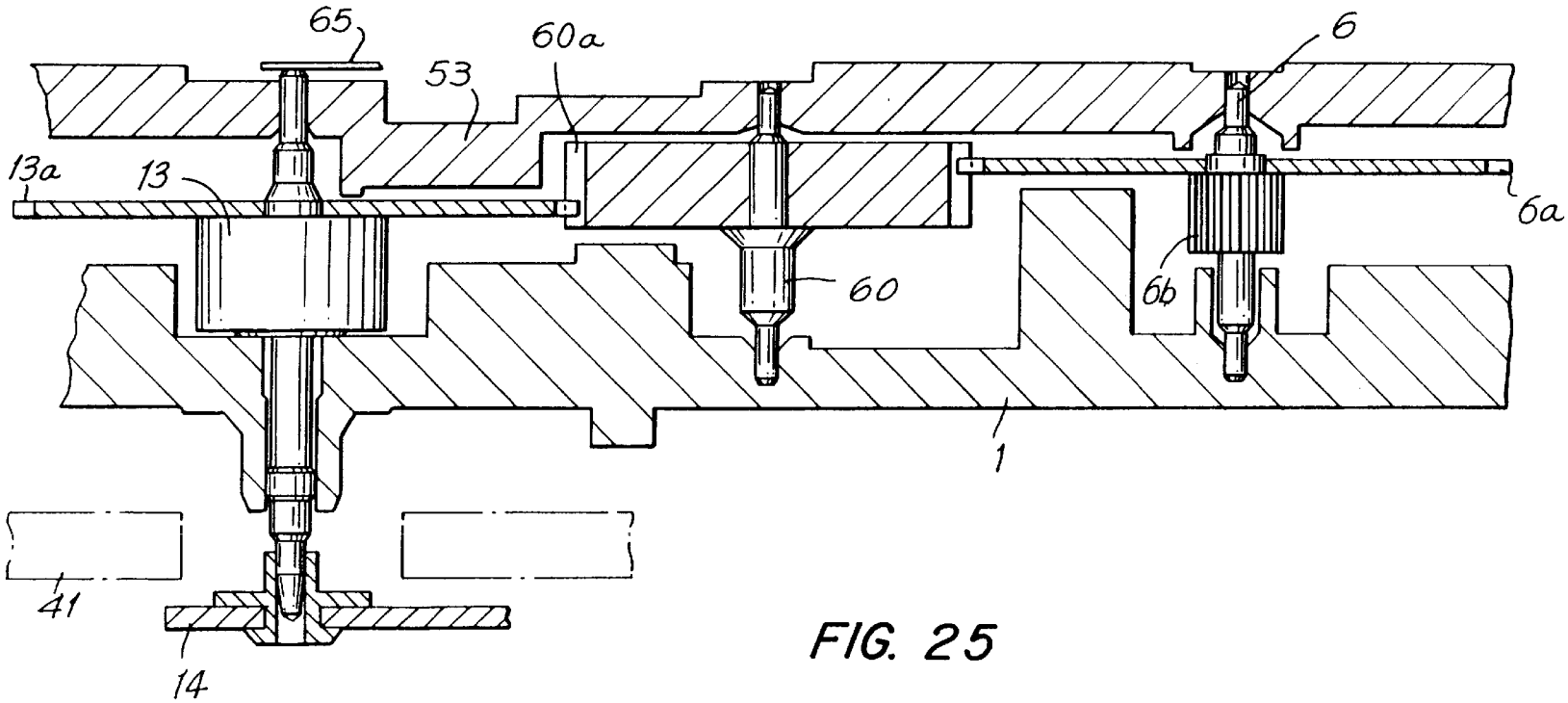
FIG. 25 is a sectional view of a wheel train for indicating normal twelve hour time seconds constructed in accordance with the second embodiment of the invention.

As seen in FIG. 25, a small second intermediate wheel having small second intermediate wheel gear 60a is rotatably supported between resin plate 1 and wheel train bridge 53. Fourth gear 6a engages with small second intermediate gear 60a which in turn engages with second gear 13a. Accordingly, the rotation of rotor 4 is transferred through small second intermediate wheel 60 to small second wheel 13. A reduction gear ratio between rotor 4 and small second wheel 13 is set at 1/30. Small second hand 14 is positioned on a distal end of small second wheel 13 to be driven to indicate seconds of ordinary time.

Chronograph second indication is controlled by step motor [D15] *D 15* as discussed in connection with multifunction electronic analog watch 100. A chronograph minute indication is controlled by step motor [C27] *C 27* in a manner identical to multifunction electronic analog watch 100.

Figure 26:
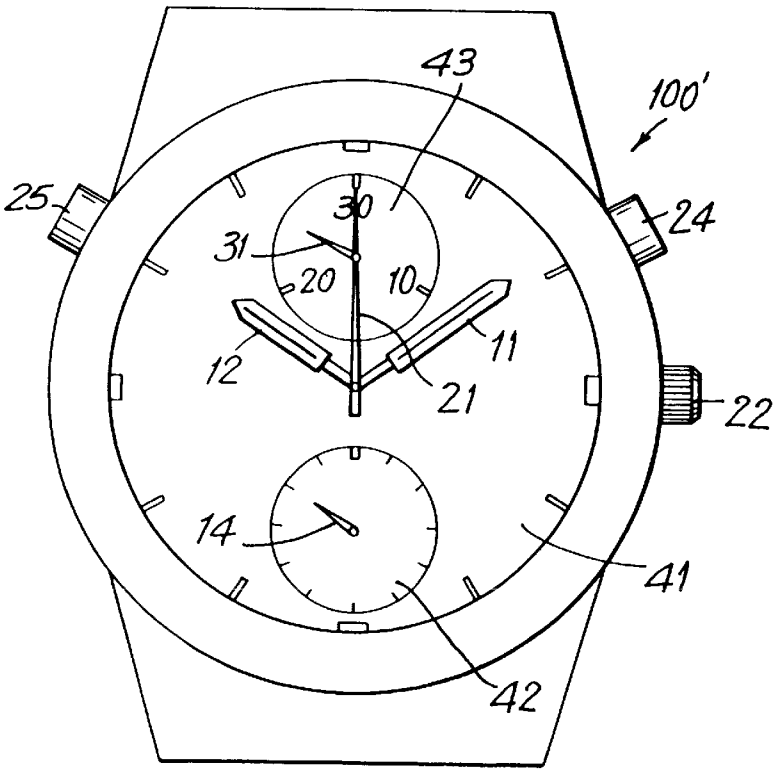
FIG. 26 is a top plan view of a multifunction analog electronic watch constructed in accordance with the second embodiment of the invention.

Reference is now made FIG. 26 in which a plan view of multifunction watch 100' is provided indicating the appearance of the watch face. Small second hand 14 for indicating twelve hour *time* seconds is positioned at the six o'clock position of face 41. Because alarm and timer function is not provided by multifunction electronic analog watch 100', only a first stem 22 is provided and only switches [A24] *A 24* and [B25] *B 25* are necessary. The hour and minute indications of twelve hour time and chronographic indication are the same as in multifunction electronic analog watch 100.

As can be seen from FIGS. 24, 25, 26 multifunction electronic analog watch *100'* provides different functions and incorporates a different structure than multifunction electronic analog watch 100. However, by providing IC 20 as depicted in FIG. 1 which includes data memory 204 and program memory 202 the same IC may be used to control both electronic analog watches by merely changing the software contained within the memory.

Figure 27:
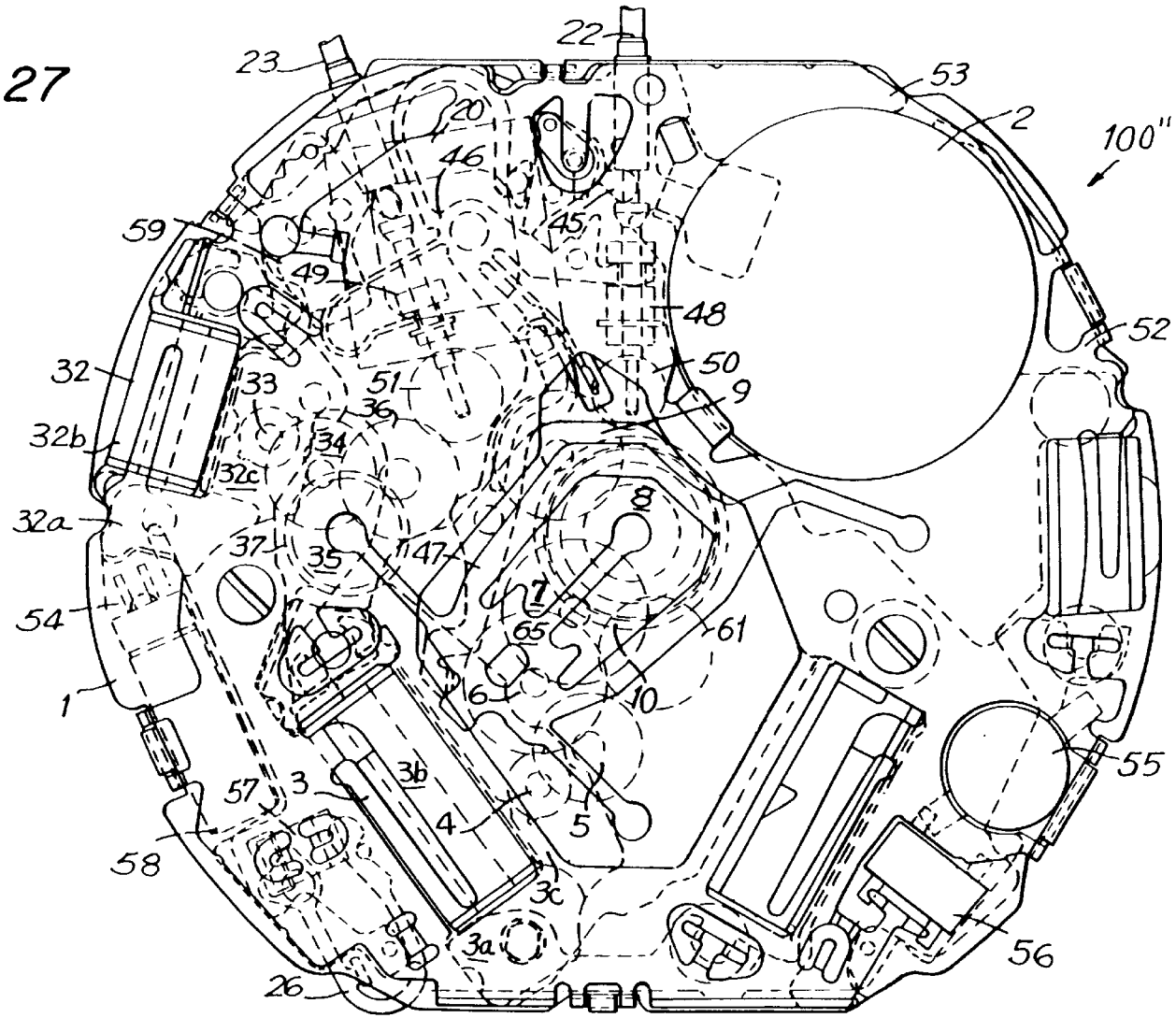
FIG. 27 is a top plan view of a multifunction analog electronic watch constructed in accordance with a third embodiment of the invention.
Figure 28:
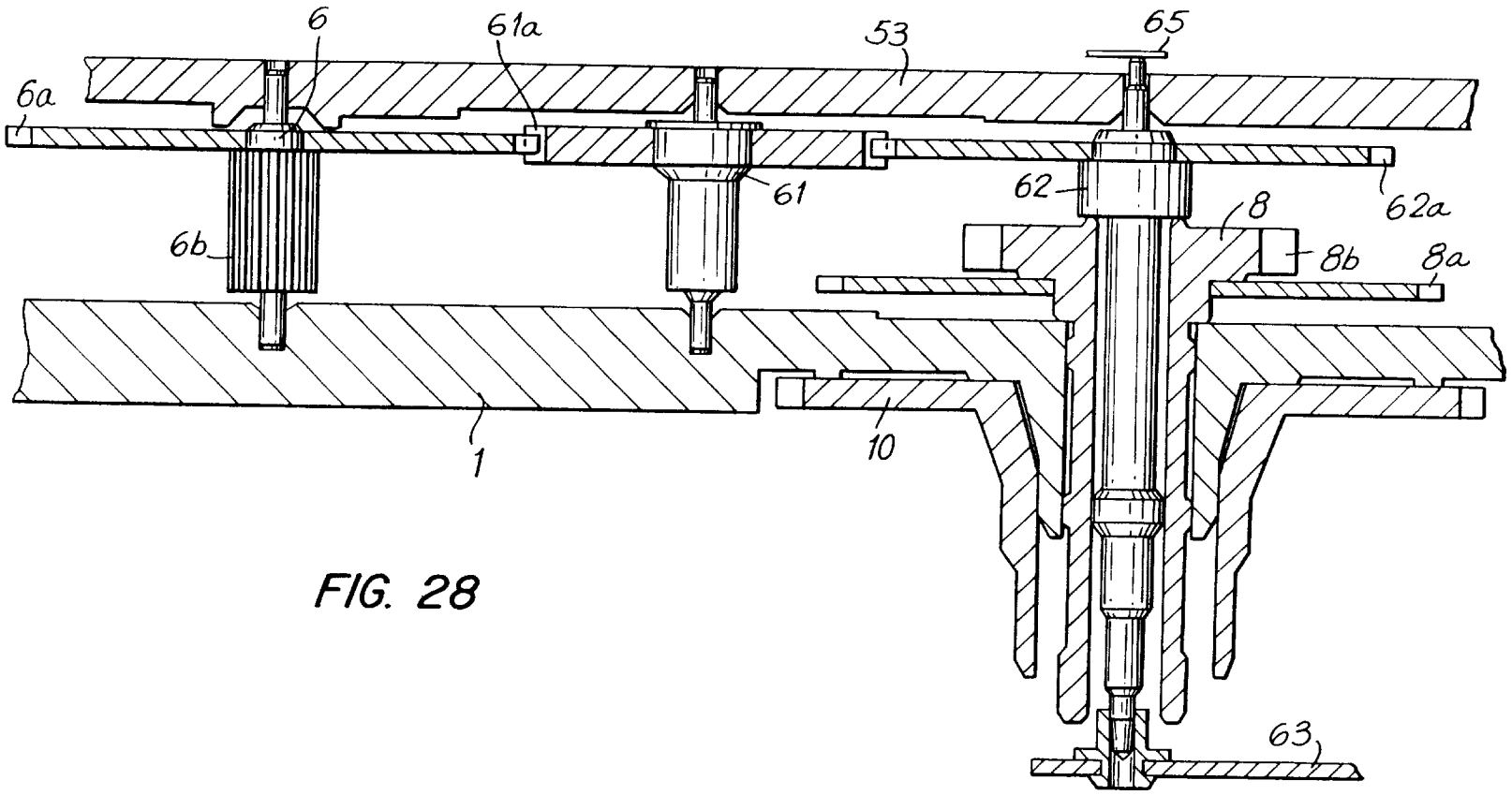
FIG. 28 is a sectional view of a wheel train for indicating normal twelve hour time seconds constructed in accordance with the third embodiment invention.

Reference is now made FIGS. 27 and 28 in which a multifunction electronic analog watch, generally indicated as 100", constructed in accordance with a third embodiment of the invention is provided. In multifunction electronic analog watch 100" and only the functions of twelve hour time indication and an alarm are provided. Accordingly, step motor B 15 of step motor C 27 are removed from multifunction electronic analog 100. The chronograph function and the elapsed time number function are removed so that 1/5 second CG first intermediate wheel 17, 1/5 second CG second intermediate wheel 18, 1/5 second CG wheel 19, minute CG intermediate wheel 29 and minute CG wheel 30 are not required and have been removed.

Additionally, in multifunction electronic analog watch 100, small second wheel 13 was positioned on an axis at the six o'clock direction of the watch movement to indicate twelve hour [ti=] *time* seconds. However, in multifunction electronic analog watch 100", small second wheel 13 is removed and replaced by a centered intermediate wheel 61 and a centered second wheel 62 supported between main plate 1 and wheel train bridge 53 at the center of multifunction electric analog watch 100" to allow the indication of seconds at the center of the watch.

As can be seen in greater detail in FIG. 28, center second wheel 62 includes a center second gear 62a and center intermediate 61 *wheel* is formed with a center intermediate gear 61a. Fourth wheel gear 6a meshes with center intermediate gear 61 which in turn meshes with center second gear 62a to transmit the rotation of rotor 4 to second wheel 8. The reduction gear ratio between rotor 4 and center second wheel 62 is 1/30. A center second hand 63 is positioned on center second wheel 62 which is driven to cause the indication of twelve hour time seconds. The indication of hours and minutes for twelve hour time as well as indication of alarm time utilizing step motor [D32] *D 32* are performed in a manner identical to that in multifunction electronic analog watch 100.

Figure 29:
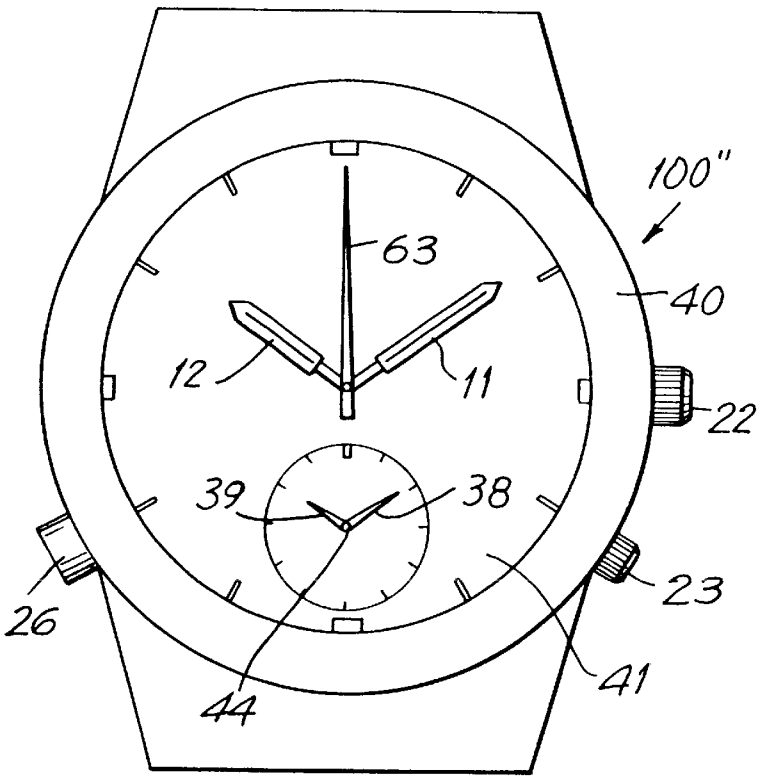
FIG. 29 is a top plan view of a multifunction analog electronic watch constructed in accordance with the third embodiment of the invention.

Reference is now made to FIG. 29 in which a top plan view of multifunction electronic analog watch 100" is provided to highlight the appearance of the watch face 41. Twelve hour time is indicated by center second hand 63 provided at the center of watch face 41. Additionally, minute hand 11 and hour hand are also disposed centrally. The method for correcting twelve hour time is similar to that of multifunction electronic analog watch 100. Additionally, because chronograph and timer functions are not provided in this embodiment, only operating switch C 26 is provided. The method for indicating the alarm set time is also the same as the process and structure of multifunction electronic analog watch 100.

Figure 30:
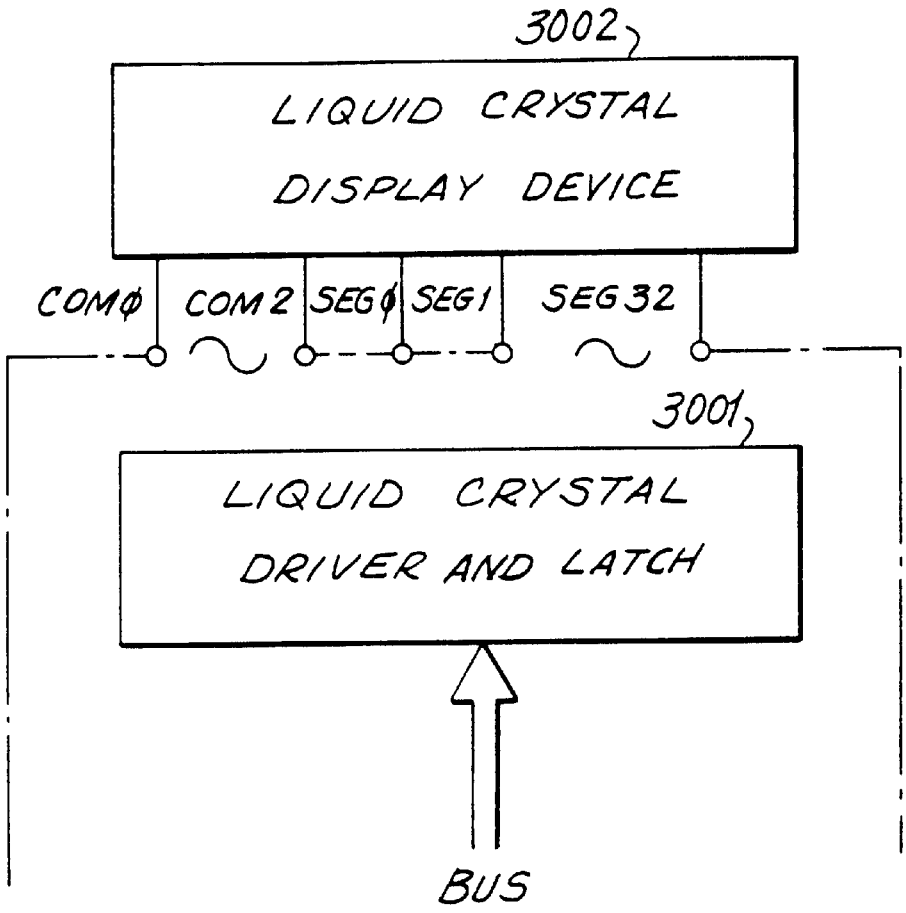
FIG. 30 is a block diagram of a multifunction electronic watch constructed in accordance with a fourth embodiment of the invention.

Reference is now made to FIG. 30 in which another embodiment of the present invention is depicted. A liquid crystal driver and latch 3001 is provided on CMOS-IC 20. The liquid crystal display 3002 driven by liquid crystal driver latch 3001 is coupled to CMOS-IC 20. In response to software commands, liquid crystal display 3002 indicates time of day, a second time different from the time of day, calendar date, alarm and time resetting time, and chronographic time in digital representation. Liquid crystal display panel 3002 displays outputs in accordance with software instructions from CPU 201 and provides digital representation of analog information displayed by multifunction electronic analog watch 100.

The above three embodiments were used by way of example. However, various specification such as for example single motor driving of the multifunctions, the indication of twelve hour time keeping at a non-central location and the like may also be provided. By providing an IC 20 which utilizes software contained within memory to drive the function, it becomes possible to adapt the IC to each of these configurations without having to remake the entire IC.

By providing a multifunction electronic analog watch in which almost all of the elements may be commonly used and providing [a] *an* IC for controlling the elements which may be adapted by reprogramming software, a multifunction analog watch is provided in which additional functions may be added or subtracted at arbitrary positions of the watch by merely selecting the number and placement of additional functions indicating step motors and the disposition of wheel trains. Accordingly, a single watch movement may be utilized in realizing a multifunction electronic analog watch having various specification. Additionally, because all of the main elements including the step motor may be commonly used, increases in the manufacturing costs and time necessary for re-casting the dies for each specification change may be avoided. By providing an IC containing programmable software, operation on multiple specifications of multifunction analog electronic watches may be simply realized by rewriting the software of the microcomputer, allowing standardization of the IC within various watches. This provides a multifunction electronic analog watch which is easily adaptable to various face designs to meet diversified consumer demand.

Additionally, by providing a small alarm watch face within the main watch face which is independent from the twelve hour time keeping mechanism, the display of the alarm time and ordinary twelve hour time by the alarm face becomes more definitive and errors in setting the alarm time will be prevented. Additionally, the alarm indications on the small watch face such as selecting alarm time and displaying ordinary time may be corrected utilizing the same stem, therefore, it may be combined with the basic watch to form a composite watch which is more easily serviceable. By providing a button for correcting the twelve hour time displayed on the small alarm watch face as well as the alarm time the correction operation may be more definitive, preventing errors in operation.

By providing the chronograph second hand at the center of the watch, time can be easily read enhancing timekeeping precision. Elapsed time indication is given by two minute hands and two second hands by reversing the motor. This is effective in discriminating the elapsed time timer from the chronograph indication facilitating the reading of time remaining. Further, by providing a chronograph second hand which is disposed centrally and counts one second for each minute of the timer elapsed time, the timer function aspect of the watch becomes more serviceable.

By providing a first watch stem for correcting twelve hour time indicated on the alarm small watch face and a second stem for correcting time on the main watch face operating efficiency is enhanced by providing correlativity between correction methods. The first stem is intended for exclusive use of time keeping of the main watch and second stem is intended for switching each time indication function mode and correction thus ensuring a simpler and easier operation. By providing the two stems at positions away from the hand indicating position, a thinner multifunction watch is provided.

By providing a plurality of alarm indicators and an alarm control means which causes the indicators to indicate a current time when the alarm is not set, an alarm set time when the alarm time is set and after the alarm time is set, current 12 hour time once the alarm is activated and releasing the alarm time from being set, thereby prohibiting the alarm from being activated when the alarm is not to be reactivated after the first occurrence of the alarm, an operation for releasing the alarm from the activation prohibited state may be omitted, simplifying watch operation. Because operation becomes simpler, the wear on the switches contained within the watch may be minimized, thus ensuring long range reliability of the watch.

Additionally, by indicating an alarm time when the alarm has been set and current 12 hour time when the alarm is not set, it becomes easier to determine whether or not the alarm is set without the need of other extraneous mode indicators. Accordingly, a watch user is free from concern as to what to do or what not to do in connection with the watch without observing any type of indication.

Additionally, by providing more than one alarm indication which is varied according to the mode, the mode can be simply identified by hearing the alarm sound. As a result, the watch user is free from concern as to which mode has been indicated. Additionally, by changing the alarm ring tone, the alarm tones may be set to indicate certain alarm uses.

When the alarm set time and a current time coincide during setting the alarm time, an alarm set state is released, correction of the alarm set time is interrupted and the alarm set state is ready for release without need for operating the watch or ensuring that an indicated state does exist.

It will thus be seen that the objects set forth above, among those made apparent by the preceding description, are efficiently attained and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, may be said to fall therebetween.

What is claimed is:

1. A multifunction electronic analog timepiece comprising a face, a plurality of indicators for displaying at least two time keeping functions on the face, a plurality of step motor means for driving at least one of the plurality of indicators, the indicators being positioned at arbitrary positions about the face in accordance with the number of step motor means and positioning of step motor means, and microcomputer means having a program memory for generating an actuating signal, the program memory storing reprogrammable software instruction for controlling the production of the actuating signal, microcomputer means having a programmable memory for generating an actuating signal, said programmable memory storing software for controlling the production of the actuating signal;

motor drive control means coupled to said microcomputer means for selectively producing at least one of a plurality of drive mode signals in response to said actuating signal;

drive reference signal forming means coupled to said microcomputer means for forming, in response to said actuating signal, a plurality of drive reference clocks each of a selected frequency and pulse duration determined by said actuating signal;

at least one drive pulse forming means associated with each of said step motor means and coupled to at least said motor drive control means and to said drive reference signal forming means for generating a drive pulse waveform of a desired frequency and number of pulses in response to at least one of said drive reference clocks and at least one of said drive mode signals;

a drive pulse selecting means associated with each of said step motor means and coupled to the associated drive pulse forming means, said motor drive control means and one of said step motor means for receiving said drive mode signals and at least the associated drive pulse waveform and in response thereto applying a driving signal, formed from said associated drive pulse waveform and with desired mode, to the associated step motor means, whereby the software stored in said microcomputer means independently drives each of said *step* motor means; and an IC, the microcomputer means being formed within said IC, the microcomputer means including a core CPU, the software commands stored within said program memory actuating said core CPU.

2. The multifunction electronic analog timepiece of claim 1, further comprising first wheel train means intermediate the first step motor means and said at least one indicator for transmitting the rotation of the first step *motor means* to the at least one indicator and second wheel train means intermediate the at least second step motor means and the remaining indicators for transmitting the rotation of the at least second step motor *means* to the remaining indicators, the positioning of the remaining indicators being further positioned in accordance with the number and position of the first wheel train means and the at least second wheel train means, the remaining indicators being time keeping indicators.

3. The multifunction electronic analog timepiece of claim 1, wherein said microcomputer controls a first step motor means and at least second step motor means, the software is reprogrammable, and said indicators include time keeping indicators, at least one of which is a twelve hour time indicator whereby the twelve hour time indicator and additional time keeping indicators may be operated by a single microcomputer independent of the positioning of the plurality of indicators.

4. The multifunction electronic analog timepiece of claim 2, wherein at least one of said remaining time keeping functions is chronograph indication.

5. The multifunction electronic analog timepiece of claim 2, wherein at least one of the remaining time keeping functions is an elapsed timer.

6. The multifunction electronic analog timepiece of claim 1, wherein one of the functions is an alarm, at least one of said indicators indicating both an alarm set time and ordinary 12 hour time, further comprising an alarm means, alarm controlling means for causing said indicator to indicate current 12 hour time when the alarm is not set, indicate an alarm set time once the alarm is set, and indicate the current 12 hour time and releasing the alarm from being set once the alarm means has been activated.

7. A multifunction electronic timepiece having a plurality of indicators for displaying at least two time keeping functions comprising:

twelve hour time indicator means for indicating twelve hour time, the twelve hour time indicator means being disposed at the center of the timepiece:

small second hand indicator means for indicating twelve hour time seconds, the second hand indicator means being disposed at a position away from the center of the timepiece; first step motor means for driving said twelve hour time indicator means and small second *hand* indicator means;

chronograph sect hand indicator means, the chronograph second indicator means providing a 1/5 second chronograph indication and being disposed on said twelve hour indicating means at the center of the timepiece;

second step motor means for driving the chronograph second indicators means;

chronograph minute indicator means, the chronograph minute indicator means being disposed at an arbitrary position away from the center of the timepiece;

third step motor means for driving the chronograph minute indicator means; and microcomputer means having a programmable memory for generating an actuating signal, said programmable memory storing software for controlling the production of the actuating signal;

motor drive control means coupled to said microcomputer means for selectively producing at least one of a plurality of drive mode signals in response to said actuating signal;

drive reference signal forming means coupled to said microcomputer means for forming, in response to said actuating signal, a plurality of drive reference clocks each of a selected frequency and pulse duration determined by said actuating signal;

at least one drive pulse forming means associated with each of said step motor means and coupled to at least said motor drive control means and to said drive reference signal forming means for generating a drive pulse waveform of a desired frequency and number of pulses in response to at least one of said drive reference clocks and at least one of said drive mode signals; and a drive pulse selecting means associated with each of said step motor means and coupled to the associated drive pulse forming means, said motor drive control means and one of said step motor means for receiving said drive mode signals and at least the associated drive pulse waveform and in response thereto applying a driving signal, formed from said associated drive pulse waveform and with desired mode, to the associated step motor means, whereby the software stored in said microcomputer means independently drives each of said *step* motor means.

8. The multifunction electronic analog timepiece of claim 7, further comprising alarm time indicator means for indicating an alarm time, the alarm time indicator means being disposed in an arbitrary position away from the center of the time piece.

9. The multifunction electronic analog timepiece of claim 8, further comprising a face, a small face disposed within said face, the alarm time indicator means being disposed within said small face, the alarm time indicating means indicating alarm set time and twelve hour time within the small face.

10. The multifunction electronic analog timepiece of claim 9, wherein said alarm time indicator means includes an hour hand and a minute hand.

11. The multifunction electronic analog timepiece of claim 8, further comprising external control means for correcting the alarm time indicated by the alarm time indicators and a second external control means for correcting the twelve hour time indicated by the twelve hour time indicators, the first control means and the second control means being disposed at different position about the timepiece.

12. The multifunction electronic analog timepiece as defined in claim 11, further comprising a third control means for correcting twelve hour time indicated by the alarm time indicators.

13. The multifunction electronic analog timepiece of claim 12, wherein the third control means includes a second stem.

14. The multifunction electronic analog timepiece of claim 8, wherein the second control means includes a first stem and a third control means may be set in a plurality of pull positions, the third control means including a second stem, the third control means determining the operating function performed by the timepiece dependent upon the pull position of the second stem.

15. A multifunction electronic timepiece having a plurality of indicators for displaying at least two time keeping functions comprising:

twelve hour time indicator means for indicating twelve hour time, the twelve hour time indicator means being disposed at the center of the timepiece;

a small second hand indicator means for indicating twelve hour time seconds, the second hand indicator means being disposed at a position away from the center of the timepiece; first step motor means for driving said twelve hour time indicator means and small second hand indicator means;

chronograph second indicator means, the chronograph second indicator means being disposed on said twelve hour indicating means at the center of the timepiece;

second step motor means for driving the chronograph second indicators means; chronograph minute indicator means, the chronograph minute indicator means being disposed at an arbitrary position away from the center of the timepiece;

third step motor means for driving the chronograph minute indicator means:

microcomputer means having a programmable memory for generating an actuating signal, said programmable memory storing software for controlling the production of the actuating signal;

motor drive control means coupled to said microcomputer means for selectively producing at least one of a plurality of drive mode signals in response to said actuating signal;

drive reference signal forming means coupled to said microcomputer means for forming, in response to said actuating signal, a plurality of drive reference clocks each of a selected frequency and pulse duration determined by said actuating signal;

at least one drive pulse forming means associated with each of said step motor means and coupled to at least said motor drive control means and to said drive reference signal forming means for generating a drive pulse waveform of a desired frequency and number of pulses in response to at least one of said drive reference clocks and at least one of said drive mode signal;

a drive pulse selecting means associated with each of said step motor means and coupled to the associated drive pulse forming means, said motor drive control means and one of said step motor means for receiving said drive mode signals and at least the associated drive pulse waveform and in response thereto applying a driving signal, formed from said associated drive pulse waveform and with desired, mode to the associated step motor means, whereby the software stored in said microcomputer means independently drives each of said *step* motor means;

alarm time indicator means for indicating an alarm time, the alarm time indicator means being disposed at an arbitrary position away from the center of the timepiece, the second step motor means and third step motor means being driven in a forward direction and in a reverse direction in response to the associated driving signal from the associated drive pulse selecting means as determined by said software, and the chronograph second indicator means and the chronograph minute indicator means indicating the minutes and seconds of elapse time when the second step motor means and third step motor means are both driven in the reverse direction in response to the associated driving signal from the associated drive pulse selecting means as determined by said software.

16. The multifunction electronic analog timepiece of claim 15, wherein said chronograph second indicator means is a hand and the chronograph minute indicator means is a hand.

17. The multifunction electronic analog timepiece of claim 16, wherein the chronograph second hand is disposed at the center of the timepiece is driven at more than one speed dependent upon the time keeping function being indicated.

18. A multifunction electron analog timepiece of claim 16, wherein the second chronograph indicator means is disposed at the center of the timepiece wherein a minute of remaining time of the elapsed time time keeping function is indicated by reversing the chronograph second indicator a distance equivalent to a chronograph second.

19. A multifunction electronic timepiece having a plurality of indicators for displaying at least two time keeping functions comprising:

twelve hour time indicator means for indicating twelve hour time, the twelve hour time indicator means being disposed at the center of the timepiece;

small second hand indicator means for indicating twelve hour time seconds, the second hand indicator means being disposed at a position away from the center of the timepiece; first [first] step motor means for driving said twelve hour time indicator means and small second hand indicator means;

chronograph second indicator means, the chronograph second indicator means being disposed on said twelve hour indicating means at the center of the timepiece;

second step motor means for driving the chronograph second indicators means;

chronograph minute indicator means, the chronograph minute indicator means being disposed at an arbitrary position away from the center of the timepiece;

third step motor means for driving the chronograph minute indicator means;

microcomputer means having a programmable memory for generating an actuating signal, said programmable memory storing software for controlling the production of the actuating signal;

motor drive control means coupled to said microcomputer means for selectively producing at least one of a plurality of drive mode signals in response to said actuating signal;

drive reference signal forming means coupled to said microcomputer means for forming, in response to said actuating signal, a plurality of drive reference clocks each of a selected frequency and pulse duration determined by said actuating signal;

at least one drive pulse forming means associated with each of said step motor means and coupled to at least said motor drive control means and to said drive reference signal forming means for generating a drive pulse waveform of a desired frequency and number of pulses in response to at least one of said drive reference clocks and at least one of said drive mode signal;

a drive pulse selecting means associated with each of said step motor means and coupled to the associated drive pulse forming means, said motor drive control means and one of said step motor means for receiving said drive mode signals and at least the associated drive pulse waveform and in response thereto applying a driving signal, formed from said associated drive pulse waveform and with desired mode, to the associated step motor means, whereby the software stored in said microcomputer means independently drives each of said *step* motor means; and alarm time indicator means for indicating an alarm time, the alarm time indicator means being disposed at an arbitrary position away from the center of the timepiece, the chronograph second indicator means being driven at more than one speed in response to the associated driving signal from the associated drive pulse selecting means as determined by said software dependent upon the function being performed by the chronograph second hand indicator means.

20. A multifunction electronic timepiece having a plurality of indicators for displaying at least two time keeping functions comprising:

twelve hour time indicator means for indicating twelve hour time, the twelve hour time indicator means being disposed at the center of the timepiece;

small second hand indicator means for indicating twelve hour time seconds, the second hand indicator means being disposed at a position away from the center of the timepiece; first step motor means for driving said twelve hour time indicator means and small second hand indicator means;

chronograph second indicator means, the chronograph second indicator means being disposed on said twelve hour indicating means at the center of the timepiece;

a second step motor means for driving the chronograph second indicator means;

chronograph minute indicator means, the chronograph minute indicator means being disposed at an arbitrary position away from the center of the timepiece;

third step motor means for driving the chronograph minute indicator means;

microcomputer means having a programmable memory for generating an actuating signal, said programmable memory storing software for controlling the production of the actuating signal;

motor drive control means coupled to said microcomputer means for selectively producing at least one of a plurality of drive mode signals in response to said actuating signal;

drive reference signal forming means coupled to said microcomputer means for forming, in response to said actuating signal, a plurality of drive reference clocks each of a selected frequency and pulse duration determined by said actuating signal;

at least one drive pulse forming means associated with each of said step motor means and coupled to at least said motor drive control means and to said drive reference signal forming means for generating a drive pulse waveform of a desired frequency and number of pulses in response to at least one of said drive reference clocks and at least one of said drive mode signals;

a drive pulse selecting means associated with each of said step motor means and coupled to the associated drive pulse forming means, said motor drive control means and one of said step motor means for receiving said drive mode signals and at least the associated drive pulse waveform and in response thereto applying a driving signal, formed from said associated drive pulse waveform and with desired mode, to the associated step motor means, whereby the software stored in said microcomputer means independently drives each of said motor means; and alarm time indicator means for indicating an alarm time, the alarm time indicator means being disposed at an arbitrary position away from the center of the timepiece, the chronograph second indicator being disposed at the center of the timepiece wherein a minute of remaining time of an elapsed time is indicated by reversing the chronograph second indicator a distance equivalent to a chronograph second.

21. An IC for a multifunction electronic analog timepiece having a plurality of indicators for displaying at least two time keeping functions, at least one time keeping function being twelve hour time and a plurality of step motors for driving said plurality of indicators comprising:

a microcomputer means including a core CPU, a programmable memory means for storing software for actuating said core CPU, said programmable memory means storing software for producing an actuating signal;

motor drive control means coupled to said microcomputer means for selectively producing at least one of a plurality of drive mode signals in response to said actuating signal;

drive reference signal forming means coupled to said microcomputer means for forming, in response to said actuating signal, a plurality of drive reference clocks each of a selected frequency and pulse duration determined by said actuating signal;

at least one drive pulse forming means associated with each of said step motor means and coupled to at least said motor drive control means and to said drive reference signal forming means for generating a drive pulse waveform of a desired frequency and number of pulses in response to at least one of said drive reference clocks and at least one of said drive mode signals; and a drive pulse selecting means associated with each of said step motor means and coupled to the associated drive pulse forming means, said motor drive control means and one of said step motor means for receiving said drive mode signals and at least the associated drive pulse waveform and in response thereto applying a driving signal, formed from said associated drive pulse waveform and with desired mode, to the associated step motor means, whereby the software stored in said microcomputer means independently drives each of said *step* motor means.

22. The IC of claim 21, wherein said drive reference *signal* forming means includes a plurality of motor clock means for controlling the pulse duration of an associated drive reference clock applied to each step motor.

23. The IC of claim 21, wherein said multifunction electronic timepiece further comprises a plurality of wheel trains coupled to said step motors for transmitting the rotation of said step motors to said plurality of indicators.

24. The IC of claim 22, wherein said multifunction electronic timepiece further comprises a plurality of wheel trains coupled to said step motors for transmitting the rotation of said step motors to said plurality of indicators.

*25. An electronic timepiece comprising:*

*a plurality of indicators, at least one of said indicators displaying at least 12 hour time and at least one of said indicators displaying an additional time keeping function;*

*a CPU for outputting at least a control signal;*

*a plurality of drive pulse forming means for generating a plurality of drive pulses;*

*a plurality of step motor means each receiving at least one of said plurality of drive pulses and driving at least one of said plurality of indicators in response thereto; and*

*selector means operatively coupled to said CPU and said drive pulse forming means, for selecting one of said step motor means in response to said control signal and providing said drive pulses generated by one of said plurality of drive pulse forming means to said selected step motor means.*

*26. The electronic timepiece of claim 25, further comprising: a face, wherein said indicator displaying 12 hour time is disposed at substantially the center of said face and said indicators displaying an additional time keeping function are disposed arbitrarily on said face at a position away from the center of said face.*

*27. The electronic timepiece of claim 25, wherein said selector means comprises:*

*drive control means for outputting drive control data to at least one of said plurality of step motor means in accordance with said control signal; and*

*a plurality of drive pulse selector means for selecting drive pulses to be supplied to said step motor means in response to said drive control data.*

*28. The electronic timepiece of claim 25, further comprising: a main bus, wherein said main bus connects said CPU to said selector means.*

*29. The electronic timepiece of claim 27, further comprising, a main bus, a first common bus and a second common bus; and wherein said CPU is connected to said drive control means through said main bus, said drive control means is connected to said drive pulse selector means through said first common bus, and said drive pulse forming means is connected to said drive pulse selector means through said second common bus.*

*30. The electronic time piece of claim 25, wherein said CPU, said plurality of drive pulse forming means and said selector means are integrally formed as an IC chip.*

*31. The electronic time piece of claim 27, wherein said CPU, said plurality of drive pulse forming means and said selector means are integrally formed as an IC chip.*

*32. The electronic time piece of claim 28, wherein said CPU, said plurality of drive pulse forming means and said selector means are integrally formed as an IC chip.*

*33. The electronic time piece of claim 29, wherein said CPU, said plurality of drive pulse forming means and said selector means are integrally formed as an IC chip.*

*34. A multifunction electronic timepiece comprising:*

*a plurality of indicators, at least one of said indicators for displaying a 12 hour time function and at least one of said indicators for displaying at least one additional time keeping function:*

*a plurality of step motor means coupled to said plurality of indicators for driving said plurality of indicators;*

*a CPU for outputting at least a control signal and a frequency determining signal;*

*reference signal forming means for receiving said frequency determining signal and generating a reference clock having a frequency generated as a function of said frequency determining signal; and*

*a plurality of motor control means for receiving said reference clock and said control signal and forming drive pulses input to said plurality of step motor means in response to said reference clock and in response to said control signals.*

*35. An IC chip for a multi-function analog electronic watch having a plurality of motors and a plurality of indicators driven by said motors to display a function, said IC chip comprising:*

*a plurality of motor drivers each for activating a respective motor;*

*a core CPU for outputting a first control signal;*

*a program memory operatively coupled to said core CPU for storing software for actuating said core CPU, said core CPU outputting said first control signal as a function of said software; and*

*a motor drive controlling means operatively coupled to said motor drivers for selectively outputting drive signals to said motor drivers, wherein said motor drive controlling means includes a motor drive system controlling means for storing drive mode for each of said motors to enable said motor drive controlling means to generate second control signals in response to said first control signals;*

*a plurality of drive pulse forming means to generate motor drive pulses; and*

*a plurality of motor driving selection means each receiving said motor drive pulses and said second control signals to select and generate said driving signals to*

*enable each of said motor drivers to activate said respective motors for driving an indicator corresponding to one of the functions of said multi-function analog electronic watch.*

*36. The IC chip of claim 35, in which said motor drive controlling means is operatively coupled to said program memory and further comprises a drive reference signal forming means for generating a reference clock having a reference frequency in response to said first control signal.*

*37. The IC chip of claim 36, in which said motor driving controlling means further includes a plurality of motor clock controlling means receiving said reference clock signal and said second control signal for generating control trigger signals in response to said first control signal.*

*38. The IC chip of claim 37, in which said plurality of motor clock controlling means each generates a number of driving pulses as said control trigger signals.*

*39. An analog multifunction electronic watch comprising a plurality of indicators,*

*a plurality of step motors;*

*at least one gear train mechanism coupling each step motor to a respective indicator to display a function; and*

*an IC chip including a plurality of motor drivers each for activating a respective motor, a core CPU for outputting a first control signal; a program memory operatively coupled to said core CPU for storing software for actuating said core CPU, said core CPU outputting said first control signal as a function of said software; and a motor drive controlling means operatively coupled to said motor drivers for selectively outputting drive signals to said motor drivers, wherein said motor drive controlling means includes a motor drive system controlling means for storing drive mode for each of said motors to enable said motor drive controlling means to generate second control signals in response to said first control signals; a plurality of drive pulse forming means to generate motor drive pulses; and a plurality of motor driving selection means each receiving said motor drive pulses and said second control signals to select and generate said driving signals to enable each of said motor drivers to activate said respective motors for driving an indicator corresponding to one of the functions of said multi-function analog electronic watch.*

*40. An analog multifunction electronic watch comprising a plurality of indicators,*

*a plurality of step motors;*

*at least one gear train mechanism coupling each step motor to a respective indicator to display a function; and*

*an IC chip including a plurality of motor drives each for activating a respective motor, a core CPU for outputting a first control signal; a program memory operatively coupled to said core CPU for storing software for actuating said core CPU, said core CPU outputting said first control signal as a function of said software; and a motor drive controlling means operatively coupled to said motor drivers for selectively outputting drive signals to said motor drivers, wherein said motor drive controlling means includes a motor drive system controlling means for storing drive mode for each of said motors to enable said motor drive controlling means to generate second control signals in response to said first control signals; a plurality of drive pulse forming means to generate motor drive pulses; and a plurality of motor driving selection means each receiving said motor drive pulses and said second control signals to select and generate said driving signals to enable each of said motor drivers to activate said respective motors for driving an indicator corresponding to one of the functions of said multi-function analog electronic watch.*

*41. The analog multifunction electronic watch of claim 40, in which said motor drive controlling means is operatively coupled to said program memory and further comprises a drive reference signal forming means for generating a reference clock having a reference frequency in response to said first control signal.*

*42. The analog multifunction electronic watch of claim 41, in which said motor driving controlling means further includes a plurality of motor clock controlling means receiving said reference clock signal and said second control signal for generating control trigger signals in response to said first control signal.*

*43. The analog multifunction electronic watch of claim 42, in which said plurality of motor clock controlling means each generates a number of driving pulses as said control trigger signals.*

*44. An electronic timepiece comprising;*

*a plurality of indicators, at least one of said indicators displaying at least 12 hour time and at least one of said indicators displaying an additional time keeping function;*

*a CPU for outputting at least a control signal;*

*a plurality of drive pulse generators for generating a plurality of drive pulses;*

*a plurality of step motors each receiving at least one of said plurality of drive pulses and driving at least one of said plurality of indicators in response thereto; and*

*at least one selector operatively coupled to said CPU and said drive pulse generators, said at least one selector selecting one of said step motors in response to said control signal and providing said drive pulses generated by one of said plurality of drive pulse generators to said selected step motor.*

*45. The electronic timepiece of claim 44, further comprising: a face, wherein said indicator displaying 12 hour time is disposed at substantially the center of said face and said indicators displaying an additional time keeping function are disposed arbitrarily on said face at a position away from the center of said face.*

*46. The electronic timepiece of claim 44, wherein said at least one selector comprises:*

*a drive controller outputting drive control data to at least one of said plurality of step motors in accordance with said control signal; and*

*a plurality of drive pulse selectors selecting drive pulses to be supplied to said step motors in response to said drive control data.*

*47. The electronic timepiece of claim 44, further comprising: a main bus, wherein said main bus connects said CPU to said at least one selector.*

*48. The electronic timepiece of claim 46, further comprising a main bus, a first common bus and a second common bus; and wherein said CPU is connected to said drive controller through said main bus, said drive controller is connected to said drive pulse selectors through said first common bus, and said drive pulse generators are connected to said drive pulse selectors through said second common bus.*

*49. The electronic time piece of claim 44, wherein said CPU, said plurality of drive pulse generators and said at least one selector are integrally formed as an IC chip.*

*50. The electronic time piece of claim 46, wherein said CPU, said plurality of drive pulse generators and said at least one selector are integrally formed as an IC chip.*

*51. The electronic time piece of claim 47, wherein said CPU, said plurality of drive pulse generators and said at least one selector are integrally formed as an IC chip.*

*52. The electronic time piece of claim 48, wherein said CPU, said plurality of drive pulse generators and said at least one selector are integrally formed as an IC chip.*

*53. A multifunction electronic timepiece comprising:*

*a plurality of indicators, at least one of said indicators for displaying a 12 hour time function and at least one of said indicators for displaying at least one additional time keeping function;*

*a plurality of step motors coupled to said plurality of indicators so as to drive said plurality of indicators;*

*a CPU for outputting at least a control signal and a frequency determining signal;*

*a reference signal generator receiving said frequency determining signal and generating a reference clock having a frequency generated as a function of said frequency determining signal; and*

*a plurality of motor controllers receiving said reference clock and said control signal and forming drive pulses input to said plurality of step motors in response to said reference clock and in response to said control signals.*

*54. An IC chip for a multi-function analog electronic watch having a plurality of motors and a plurality of indicators driven by said motors to display a function said IC chip comprising:*

*a plurality of motor drivers each for activating a respective motor;*

*a core CPU for outputting a first control signal;*

*a program memory operatively coupled to said core CPU for storing software for actuating said core CPU, said core CPU outputting said first control signal as a function of said software; and*

*a motor drive controller operatively coupled to said motor drivers for selectively outputting drive signals to said motor drivers, wherein said motor drive controller includes a motor drive system controller for storing drive mode for each of aid motors to enable said motor drive controller to generate second control signals in response to said first control signals;*

*a plurality of drive pulse generators to generate motor drive pulses; and*

*a plurality of motor driving selectors each receiving said motor drive pulses and said second control signals to select and generate said drive signals to enable each of said motor drivers to activate said respective motors for driving an indicator corresponding to one of the functions of said multi-function analog electronic watch.*

*55. The IC chip of claim 54, in which said motor drive controller is operatively coupled to said program memory and further comprises a drive reference signal generator generating a reference clock having a reference frequency in response to said first control signal.*

*56. The IC chip of claim 55, in which said motor driving controller further includes a plurality of motor clock controllers receiving said reference clock signal and said second control signal, and generating control trigger signals in response to said first control signal.*

*57. The IC chip of claim 56, in which said plurality of motor clock controllers each generates a number of driving pulses as said control trigger signals.*

*58. An analog multifunction electronic watch comprising a plurality of indicators,*

*a plurality of step motors;*

*at least one gear train mechanism coupling each step motor to a respective indicator to display a function; and*

*an IC chip including a plurality of motor drivers each for activating a respective motor, a core CPU for outputting a first control signal; a program memory operatively coupled to said core CPU for storing software for actuating said core CPU, said core CPU outputting said first control signal as a function of said software; and a motor drive controller operatively coupled to said motor drivers for selectively outputting drive signals to said motor drivers, wherein said motor drive controller includes a motor drive system controller for storing drive mode for each of said motors to enable said motor drive controller to generate second control signals in response to said first control signals; a plurality of drive pulse generators to generate motor drive pulses; and a plurality of motor driving selectors each receiving said motor drive pulses and said second control signals to select and generate said drive signals to enable each of said motor drivers to activate said respective motors for driving an indicator corresponding to one of the functions of said multi-function analog electronic watch.*

*59. The analog multifunction electronic watch of claim 58, in which said motor drive controller is operatively coupled to said program memory and further comprises a drive reference signal generator generating a reference clock having a reference frequency in response to said first control signal.*

*60. The analog multifunction electronic watch of claim 59, in which said motor driving controller further includes a plurality of motor clock controllers receiving said reference clock signal and said second control signal, and generating control trigger signals in response to said first control signal.*

*61. The analog multifunction electronic watch of claim 60, in which said plurality of motor clock controllers each generates a number of driving pulses as said control trigger signals.*

* * * * *